US012794307B2

(12) United States Patent
Hubbard

(10) Patent No.: US 12,794,307 B2
(45) Date of Patent: Nov. 10, 2026

(54) ENERGY CONVERSION DEVICE ENCLOSURE SYSTEM AND METHOD

(71) Applicant: AVAIO Management LP, Stamford, CT (US)

(72) Inventor: Joseph Patrick Hubbard, Canton, TX (US)

(73) Assignee: AVAIO Management LP, Stamford, CT (US)

( * ) Notice: Subject to any disclaimer, the term of this patent is extended or adjusted under 35 U.S.C. 154(b) by 0 days.

(21) Appl. No.: 19/207,226

(22) Filed: May 13, 2025

(65) Prior Publication Data

US 2025/0350166 A1 Nov. 13, 2025

Related U.S. Application Data

(60) Provisional application No. 63/646,527, filed on May 13, 2024.

(51) Int. Cl.
*H02K 5/20* (2006.01)
*H02K 5/22* (2006.01)

(52) U.S. Cl.
CPC ................. *H02K 5/20* (2013.01); *H02K 5/22* (2013.01)

(58) Field of Classification Search
CPC .................................. H02K 5/20; H02K 5/22
See application file for complete search history.

(56) References Cited

U.S. PATENT DOCUMENTS

| | | | | |
|---|---|---|---|---|
| 6,415,557 | B1 * | 7/2002 | McCalley | E04H 9/14 52/584.1 |
| 7,543,793 | B2 * | 6/2009 | Graham | F16M 1/00 290/1 A |
| 2007/0152126 | A1 | 7/2007 | Graham et al. | |
| 2008/0048456 | A1 * | 2/2008 | Browning | H02K 7/1823 290/1 A |
| 2018/0109112 | A1 * | 4/2018 | Paine | E04H 5/02 |
| 2018/0109163 | A1 | 4/2018 | Paine et al. | |
| 2022/0018284 | A1 * | 1/2022 | Yeung | F04B 17/05 |

(Continued)

FOREIGN PATENT DOCUMENTS

GB 2527805 A * 1/2016 ................ H02J 9/00

OTHER PUBLICATIONS

International Search Report and Written Opinion on PCT/US2025/029201 dtd Jul. 21, 2025.

*Primary Examiner* — Terrell L Mckinnon
*Assistant Examiner* — Ding Y Tan
(74) *Attorney, Agent, or Firm* — Foley & Lardner LLP

(57) ABSTRACT

An energy conversion device enclosure system and method that, in certain implementations, may include an expandable system for enclosing one or more generators having a first set of mounting members positioned along a support surface, and a second set of mounting members positioned parallel to the first set. Removable enclosure panels may be coupled between the mounting members, with a first panel featuring a fuel access opening and a second panel having an air intake opening with louvers to provide air flow from one side of the energy conversion device enclosure to the other. Telemetry subsystems may be integrated into a third panel, while a fourth panel is substantially perpendicular to the first and second panels. The fourth panel may be removable to facilitate the expansion of the system in response to future increased energy demand.

20 Claims, 10 Drawing Sheets

(56) References Cited

U.S. PATENT DOCUMENTS

| | | | | |
|---|---|---|---|---|
| 2022/0098886 | A1* | 3/2022 | More | E04H 5/02 |
| 2023/0261540 | A1* | 8/2023 | Parr | H02K 7/1815<br>310/66 |

* cited by examiner

ENERGY CONVERSION DEVICE ENCLOSURE SYSTEM AND METHOD

CROSS-REFERENCE TO RELATED PATENT APPLICATIONS

This application claims the benefit of and the priority to U.S. Provisional Patent Application No. 63/646,527, filed May 13, 2024, the entire disclosure of which is incorporated by reference herein for any and all purposes.

BACKGROUND

Conventional enclosures have long been utilized to house and protect energy conversion devices (e.g., electrical generators) from environmental elements and potential damage. However, these enclosures often come with inherent drawbacks that hinder their efficiency and cost-effectiveness.

One significant issue with conventional enclosures is their individual costs. Integrated device enclosures typically require significant upfront investment and often have prohibitive lead times to acquisition. These costs can add up substantially, especially for businesses or individuals requiring multiple devices or customized solutions.

Additionally, conventional enclosures may lack versatility and adaptability. Fixed designs may not accommodate future modifications, or upgrades, or additions to the energy conversion system, leading to inefficiencies and additional costs if alterations or additional energy conversion devices are required. Indeed, maintenance or replacement of an energy conversion device that requires removal of the energy conversion device imposes substantial difficulties as energy conversion devices are often unable to fit through conventional building openings (e.g., doors).

Furthermore, conventional enclosures often struggle to provide adequate ventilation and cooling for energy conversion devices, especially in high-demand or extreme climate conditions. Poor ventilation can result in overheating, reduced performance, and increased maintenance requirements, impacting the overall reliability and longevity of the energy conversion system.

SUMMARY

An enclosure system and method for enclosing one or more energy conversion devices, such as electrical generators, while providing adequate ventilation, fuel access, and maintenance access, while maintaining future expandability is needed. However, the systems and methods provided herein can prove useful to other technical areas. Therefore, at least some claims should not be construed as necessarily limited to addressing any of the above challenges.

In some aspects, the techniques described herein relate to a system for enclosing a plurality of generators, the system including: a first plurality of mounting members extending in a direction generally vertical from a support surface, the first plurality of mounting members positioned substantially collinearly when viewed from a first direction along the support surface, wherein the first plurality of mounting members are positioned a first distance from adjacent mounting members of the first plurality of mounting members; a second plurality of mounting members extending in the direction generally vertical from the support surface, the second plurality of mounting members positioned substantially collinearly when viewed from a second direction along the support surface, wherein the second plurality of mounting members are positioned the first distance from adjacent mounting members of the second plurality of mounting members; a first enclosure panel extending at least partially between a first mounting member of the first plurality of mounting members and a second mounting member of the first plurality of mounting members, the first enclosure panel removably coupled to the first mounting member and the second mounting member, wherein the first enclosure panel includes a fuel access opening positioned within a lower portion of the first enclosure panel; a second enclosure panel extending at least partially between a third mounting member of the second plurality of mounting members and a fourth mounting member of the second plurality of mounting members, the second enclosure panel removably coupled to the first mounting member and the second mounting member, wherein the second enclosure panel includes an air intake opening with one or more louvers spanning at least partially the air intake opening; a third enclosure panel extending at least partially between the first mounting member and the third mounting member and including one or more telemetry subsystems communicatively coupled to the plurality of generators; and a protective covering coupled to at least one of the first mounting member, the second mounting member, the third mounting member, and the fourth mounting member, and configured to allow removal of at least one of the first enclosure panel and the second enclosure panel without removal of the protective covering.

In some aspects, the techniques described herein relate to a system, further including: a first contingent mounting member within the first plurality of mounting members; and a second contingent mounting member within the second plurality of mounting members.

In some aspects, the techniques described herein relate to a system, wherein the first contingent mounting member and the second contingent mounting member are uncoupled to an enclosure panel in a first configuration and coupled to one or more enclosure panels in a second configuration.

In some aspects, the techniques described herein relate to a system, wherein the support surface is a cementitious slab.

In some aspects, the techniques described herein relate to a system, wherein the support surface is an aggregate substrate.

In some aspects, the techniques described herein relate to a system, wherein the aggregate substrate is gravel.

In some aspects, the techniques described herein relate to a system, wherein the first distance is wider than a width of a multiple of generators by a clearance threshold.

In some aspects, the techniques described herein relate to a system, wherein the clearance threshold is a percentage of the width of a generator.

In some aspects, the techniques described herein relate to a system, wherein the one or more louvers span the air intake opening substantially vertically.

In some aspects, the techniques described herein relate to a system, wherein the one or more louvers span the air intake opening substantially horizontally.

In some aspects, the techniques described herein relate to a system, wherein at least one of the first enclosure panel, the second enclosure panel, or the third enclosure panel is coupled to an acoustically dampening material.

In some aspects, the techniques described herein relate to a system, wherein the one or more telemetry subsystems include a building management subsystem, a transformer subsystem, a fire protection subsystem, and a panel board subsystem.

In some aspects, the techniques described herein relate to a system, wherein the first mounting member includes: a vertical member; a base plate coupled to a proximal end of the vertical member; a top plate coupled to a distal end of the vertical member; and a mounting flange.

In some aspects, the techniques described herein relate to a system, wherein the mounting flange includes a mounting aperture extending from a first surface of the mounting flange to a second surface of the mounting flange and substantially aligns with an enclosure panel mounting aperture of an enclosure panel.

In some aspects, the techniques described herein relate to a system, further including a gasket disposed between the first mounting member and the first enclosure panel.

In some aspects, the techniques described herein relate to a system, wherein the first mounting member is an I-beam.

In some aspects, the techniques described herein relate to a system, wherein the first enclosure panel is removably coupled to the first mounting member by a first member spanning between the first mounting member and the second mounting member; wherein the second enclosure panel is removably coupled to the third mounting member by a second member spanning between the third mounting member and the fourth mounting member.

In some aspects, the techniques described herein relate to a system for enclosing a plurality of generators, the system including: a first level including: a first plurality of mounting members extending in a direction generally vertical from a first support surface, the first plurality of mounting members positioned substantially collinearly when viewed from a first direction along the first support surface, wherein the first plurality of mounting members are positioned a first distance from adjacent mounting members of the first plurality of mounting members; a second plurality of mounting members extending in the direction generally vertical from the first support surface, the second plurality of mounting members positioned substantially collinearly when viewed from a second direction along the first support surface, wherein the second plurality of mounting members are positioned the first distance from adjacent mounting members of the second plurality of mounting members; a first enclosure panel extending at least a partially between a first mounting member of the first plurality of mounting members and a second mounting member of the first plurality of mounting members, the first enclosure panel removably coupled to the first mounting member and the second mounting member, wherein the first enclosure panel includes a fuel access opening positioned within a lower portion of the first enclosure panel; and a second enclosure panel extending at least partially between a third mounting member of the second plurality of mounting members and a fourth mounting member of the second plurality of mounting members, the second enclosure panel removably coupled to the first mounting member and the second mounting member, wherein the second enclosure panel includes a first air intake opening with one or more louvers spanning at least partially the first air intake opening; a second level including: a third plurality of mounting members extending in a direction generally vertical from a second support surface, the third plurality of mounting members positioned substantially collinearly when viewed from the first direction along the second support surface, wherein the third plurality of mounting members are positioned the first distance from adjacent mounting members of the third plurality of mounting members; a fourth plurality of mounting members extending in the direction generally vertical from the second support surface, the fourth plurality of mounting members positioned substantially collinearly when viewed from the second direction along the second support surface, wherein the fourth plurality of mounting members are positioned the first distance from adjacent mounting members of the fourth plurality of mounting members; a third enclosure panel extending at least partially between a fifth mounting member of the third plurality of mounting members and a sixth mounting member of the third plurality of mounting members, the third enclosure panel removably coupled to the fifth mounting member and the sixth mounting member; and a fourth enclosure panel extending at least partially between a seventh mounting member of the fourth plurality of mounting members and an eighth mounting member of the fourth plurality of mounting members, the fourth enclosure panel removably coupled to the seventh mounting member and the eighth mounting member, wherein the second enclosure panel includes a second air intake opening with one or more louvers spanning at least partially the second air intake opening; and a protective covering coupled to at least one of the fifth mounting member, the sixth mounting member, the seventh mounting member, and the eighth mounting member, and configured to allow removal of at least one of the third enclosure panel and the fourth enclosure panel without removal of the protective covering.

In some aspects, the techniques described herein relate to a system, further including: a first fluid reservoir positioned on the first support surface; a second fluid reservoir positioned on the second support surface; and a pump configured to fluidly drive a fluid from the first fluid reservoir to the second fluid reservoir.

In some aspects, the techniques described herein relate to a system for enclosing a plurality of generators positioned adjacent a primary data center, the system including: a first plurality of mounting members extending in a direction generally vertical from a support surface, the first plurality of mounting members positioned substantially collinearly when viewed from a first direction along the support surface, wherein the first plurality of mounting members are positioned a first distance from adjacent mounting members of the first plurality of mounting members; a second plurality of mounting members extending in the direction generally vertical from the support surface, the second plurality of mounting members positioned substantially collinearly when viewed from a second direction along the support surface, wherein the second plurality of mounting members are positioned the first distance from adjacent mounting members of the second plurality of mounting members; a first enclosure panel extending at least partially between a first mounting member of the first plurality of mounting members and a second mounting member of the first plurality of mounting members, the first enclosure panel removably coupled to the first mounting member and the second mounting member, wherein the first enclosure panel includes an air output opening with one or more louvers spanning at least partially the air output opening, wherein the air output opening is configured to direct heated air away from the primary data center or electrical equipment positioned between the primary data center and the first enclosure panel; a second enclosure panel extending at least partially between a third mounting member of the second plurality of mounting members and a fourth mounting member of the second plurality of mounting members, the second enclosure panel removably coupled to the first mounting member and the second mounting member, wherein the second enclosure panel includes an air intake opening with one or more louvers spanning at least partially the air intake opening; a third enclosure panel extending at least partially between the first mounting member and the third mounting member and including one or more telemetry subsystems communicatively coupled to the plurality of generators; and an energy conversion device positioned between the first enclosure panel and the second enclosure panel and configured to be removed from an opening formed by removal of the second enclosure panel.

In some aspects, the techniques described herein relate to a system, wherein the first enclosure panel includes at least one lifting coupler configured to couple to a lifting mechanism during removal of the first enclosure panel from the first mounting member and the second mounting member.

In some aspects, the techniques described herein relate to a system, wherein the first enclosure panel is made of a cementitious material.

In some aspects, the techniques described herein relate to a system, wherein the second enclosure panel is made of one of a fiberglass panel, a sheet metal panel, a wood panel, and a fibrous panel.

In some aspects, the techniques described herein relate to a system, wherein the third enclosure panel is a non-removable enclosure panel.

In some aspects, the techniques described herein relate to an apparatus for enclosing one or more generators, the apparatus including: a panel including: a recessed surface along at least a portion of a first side of the panel, wherein the recessed surface is offset from a front surface and corresponds to a shape of a mounting flange of a mounting member; a mounting aperture extending from the recessed surface of the panel to a second surface of the panel; and an aperture extending from a first surface of the panel to the second surface of the panel; and a lifting coupler.

In some aspects, the techniques described herein relate to an apparatus, wherein the mounting aperture is a circular right cylinder.

In some aspects, the techniques described herein relate to an apparatus, further including an access cover coupled to the panel and positioned to at least partially block the aperture.

In some aspects, the techniques described herein relate to an apparatus, wherein the access cover is one of a door, a flap, a port, and a slide.

In some aspects, the techniques described herein relate to an apparatus, wherein the lifting coupler is coupled to a top surface at a top portion of the panel.

In some aspects, the techniques described herein relate to an apparatus, wherein the lifting coupler is coupled to a back surface of the panel.

In some aspects, the techniques described herein relate to an apparatus, wherein the recessed surface extends from a bottom side of the panel to a top side of the panel.

In some aspects, the techniques described herein relate to an apparatus, wherein the aperture is a fuel access opening.

In some aspects, the techniques described herein relate to an apparatus, wherein the fuel access opening is configured to receive a fuel conduit.

In some aspects, the techniques described herein relate to an apparatus, wherein the fuel conduit is a hose.

In some aspects, the techniques described herein relate to an apparatus, wherein the aperture is an air intake opening.

In some aspects, the techniques described herein relate to an apparatus, further including a louver extending from a first inner surface of the air intake opening to a second inner surface of the air intake opening, wherein the first inner surface and the second inner surface define, in part, an outer perimeter of the aperture.

In some aspects, the techniques described herein relate to an apparatus, wherein the lifting coupler includes an inner surface defining a hole extending from a third surface of the lifting coupler to a fourth surface of the lifting coupler.

In some aspects, the techniques described herein relate to an apparatus, further including a movable access cover coupled to the panel and covering the fuel access opening in a first position and allowing access to the fuel access opening when in a second position.

In some aspects, the techniques described herein relate to an apparatus, wherein the louver is selectively positionable from a closed state to an open state.

In some aspects, the techniques described herein relate to an apparatus, wherein a horizontal width of the panel from a first edge to a second edge is greater than a width of a generator.

In some aspects, the techniques described herein relate to a system for enclosing a plurality of generators, the system including: a first plurality of mounting members vertically extending from a support surface, each of the first plurality of mounting members positioned substantially collinearly along the support surface, wherein each of the first plurality of mounting members are positioned a first distance from adjacent mounting members of the first plurality of mounting members; a second plurality of mounting members vertically extending from the support surface, each of the second plurality of mounting members positioned substantially collinearly along the support surface and substantially parallel to the first plurality of mounting members, wherein each of the second plurality of mounting members are positioned the first distance from adjacent mounting members of the second plurality of mounting members; a first enclosure panel extending vertically from the support surface and extending horizontally from a first mounting member of the first plurality of mounting members to a second mounting member of the first plurality of mounting members, the first enclosure panel non-removably coupled to the first mounting member and the second mounting member; wherein the first enclosure panel includes a selectable fuel distribution device positioned within a lower portion of the first enclosure panel; a second enclosure panel extending vertically from the support surface and extending horizontally from the second mounting member to a third mounting member of the first plurality of mounting members; a third enclosure panel extending vertically from the support surface and extending horizontally from a fourth mounting member of the second plurality of mounting members to a fifth mounting member of the second plurality of mounting members, the third enclosure panel non-removably coupled to the third mounting member and the fourth mounting member; a fourth enclosure panel extending vertically from the support surface and extending horizontally from the fifth mounting member to a sixth mounting member of the second plurality of mounting members, the fourth enclosure panel removably coupled to the fifth mounting member and the sixth mounting member, wherein the fourth enclosure panel is substantially parallel to the second enclosure panel; wherein the fourth enclosure panel includes an air intake opening with one or more louvers spanning the air intake opening; a fifth enclosure panel extending vertically from the support surface and extending horizontally from the first mounting member to the fourth mounting member, the fifth enclosure panel non-removably coupled to the first mounting member and the fourth mounting member; wherein the fifth enclosure panel includes one or more telemetry subsystems communicatively coupled to the plurality of generators; a sixth enclosure panel extending vertically from the support surface and extending horizontally from the third mounting member to the sixth mounting member, the sixth enclosure panel removably coupled to the third mounting member and the sixth mounting member; and a protective covering coupled to at least one of the first mounting member, the second mounting member, the third mounting member, the fourth mounting member, the fifth mounting member, and the sixth mounting member and configured to allow removal of at least one of the second enclosure panel, the fourth enclosure panel, and the fifth enclosure panel without removal of the protective covering.

In some aspects, the techniques described herein relate to a system, wherein the selectable fuel distribution device is a multi-port valve for selectably routing fluid to one or more generators within the system.

In some aspects, the techniques described herein relate to a system, further including a fluid conduit fluidly coupled at a first end of the fluid conduit to a first port of the selectable fuel distribution device and fluidly coupled at a second end of the fluid conduit to a fluid reservoir corresponding to a generator.

In some aspects, the techniques described herein relate to a system, further including a second fluid conduit fluidly coupled at a first end of the second fluid conduit to a second port of the selectable fuel distribution device and fluidly coupled at a second end of the second fluid conduit to a second fluid reservoir corresponding to a second generator.

In some aspects, the techniques described herein relate to a method including: removing an enclosure panel from an enclosure, wherein the enclosure panel forms at least in part an enclosed area in which a generator is positioned; removing the generator from the enclosed area through an opening into the enclosed area, the opening formed at least in part by the removal of the enclosure panel; performing an operation on the generator while the generator is removed from the enclosed area; positioning the generator back within the enclosed area through the opening after performing the operation on the generator; placing the enclosure panel adjacent the enclosure to cover the opening; coupling the enclosure panel to the enclosure with one or more removable fasteners.

In some aspects, the techniques described herein relate to a method, wherein the enclosed area includes a first story and a second story;

In some aspects, the techniques described herein relate to a method, wherein the generator is positioned on the second story of the enclosed area.

In some aspects, the techniques described herein relate to a method, wherein the enclosure panel spans across the first story and the second story.

In some aspects, the techniques described herein relate to a method, further including: providing fuel to a fluid reservoir through a fuel access opening within the enclosure panel.

In some aspects, the techniques described herein relate to a method, wherein the enclosure includes: a first plurality of mounting members extending in a direction generally vertical from a support surface, the first plurality of mounting members positioned substantially collinearly when viewed from a first direction along the support surface, wherein the first plurality of mounting members are positioned a first distance from adjacent mounting members of the first plurality of mounting members; a second plurality of mounting members extending in the direction generally vertical from the support surface, the second plurality of mounting members positioned substantially collinearly when viewed from a second direction along the support surface, wherein the second plurality of mounting members are positioned the first distance from adjacent mounting members of the second plurality of mounting members; a first enclosure panel extending at least partially between a first mounting member of the first plurality of mounting members and a second mounting member of the first plurality of mounting members, the first enclosure panel removably coupled to the first mounting member and the second mounting member, wherein the first enclosure panel includes a fuel access opening positioned within a lower portion of the first enclosure panel; a second enclosure panel extending at least partially between a third mounting member of the second plurality of mounting members and a fourth mounting member of the second plurality of mounting members, the second enclosure panel removably coupled to the first mounting member and the second mounting member, wherein the second enclosure panel includes an air intake opening with one or more louvers spanning at least partially the air intake opening; a third enclosure panel extending at least partially between the first mounting member and the third mounting member and including one or more telemetry subsystems communicatively coupled to the plurality of generators; and a protective covering coupled to at least one of the first mounting member, the second mounting member, the third mounting member, and the fourth mounting member, and configured to allow removal of at least one of the first enclosure panel and the second enclosure panel without removal of the protective covering.

BRIEF DESCRIPTION OF THE DRAWINGS

The accompanying drawings constitute a part of this specification and illustrate embodiments that, together with the specification, explain the subject matter.

Figure 1:
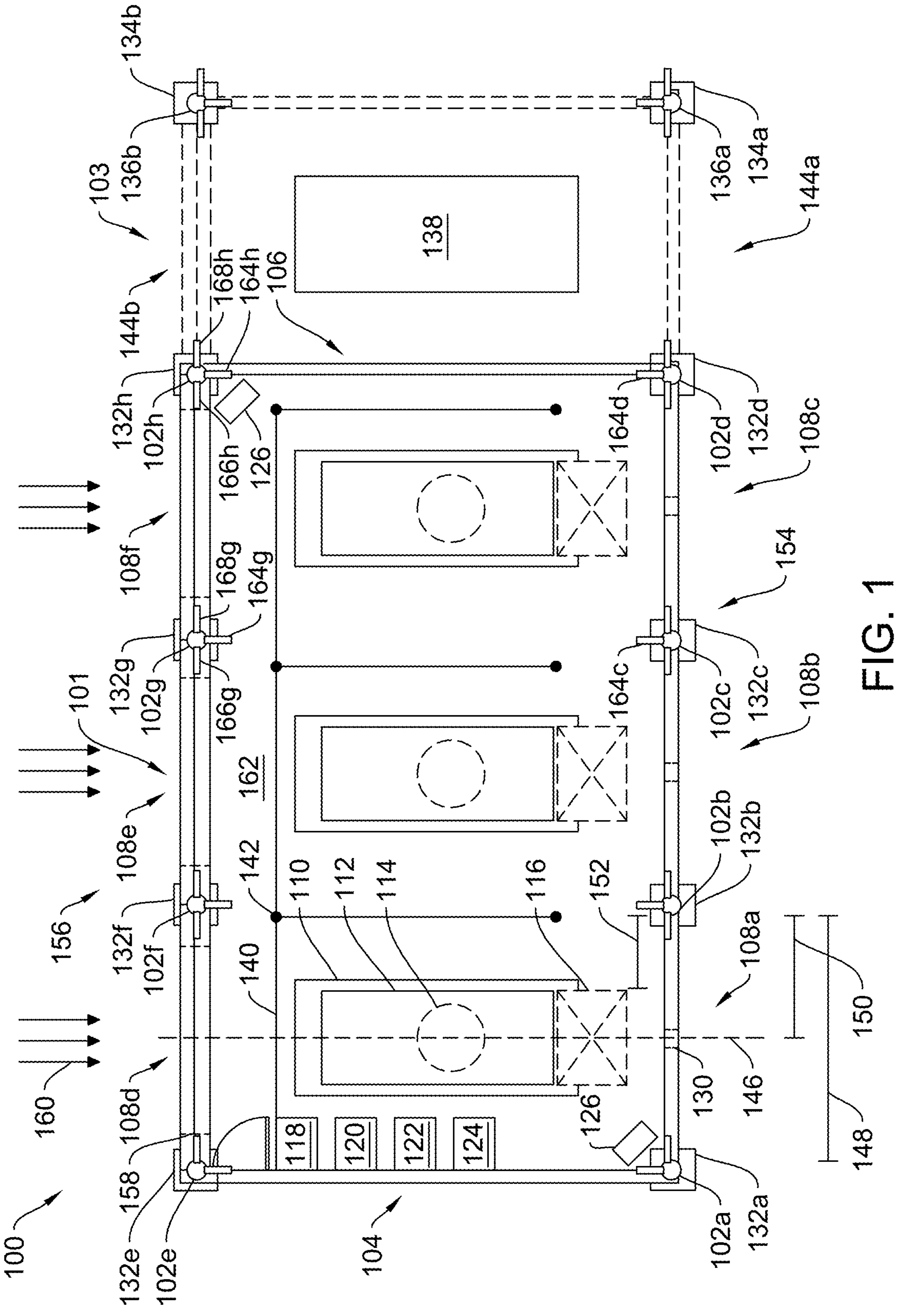
FIG. 1 is a top-view of a modular enclosure, according to an embodiment.

It will be recognized that some or all of the figures are schematic representations for purposes of illustration. The figures are provided for the purpose of illustrating one or more embodiments or implementations with the explicit understanding that they will not be used to limit the scope or the meaning of the claims.

DETAILED DESCRIPTION

In the following detailed description and the attached drawings and appendices, numerous specific details are set forth to provide a thorough understanding of the present disclosure. However, those skilled in the art will appreciate that the present disclosure may be practiced, in some instances, without such specific details. In other instances, well-known elements have been illustrated in schematic or block diagram form in order not to obscure the present disclosure in unnecessary detail. Additionally, for the most part, specific details, and the like, have been omitted inasmuch as such details are not considered necessary to obtain a complete understanding of the present disclosure, and are considered to be within the understanding of persons of ordinary skill in the relevant art.

In at least one exemplary implementation of the methods and systems discussed herein, an enclosure system for one or more energy conversion devices may include removable walls (either internal partitions or external walls). While the energy conversion device may be any number of energy conversion devices (e.g., a turbine, a heat exchanger, a hot water boiler, a steam boiler, a transformer, a gas-powered generator, a battery, a diesel-powered generator, a natural gas generator, or an electrical generator), reference to a generic generator is made for simplicity and ease in describing the systems and methods discussed herein, and should in no way be considered limiting as to the scope of the description. The removable walls may be used for facilitating the ingress and egress of one or more generators and the future expandability of the enclosure system. The removable walls may be mounted on vertical mounting members anchored to a support surface through the use of cementitious footers. The vertical mounting members may be placed from each other at discrete distances to facilitate the ingress and egress of one or more generators. By way of example, the discrete distances may correspond to a width of a generator housed within the enclosure. For example, the distance between two subsequent vertical mounting members may be equal to the width of the generator housed between the two vertical mounting members plus a clearance threshold. In other words, for a generator that is 15 feet wide at its widest point, the two vertical mounting members between which the generator ingresses or egresses may be distanced 15 feet apart, plus a clearance threshold of, for example, 5 feet on either side of the generator. This configuration allows for the 15-foot wide generator to be placed within, or removed from, the enclosure while only removing a single removable wall. Thus, mounting pads upon which the generators are mounted may correspond to locations between vertical mounting members, such as placed substantially in line with a midpoint between the two adjacent vertical mounting members. In some embodiments, the vertical mounting members on opposing sides of the enclosure are anchored to the support surface in line with each other so as to allow a generator to pass into, through, and out of the enclosure with only two removable walls removed (e.g., two corresponding removable walls on opposing sides of the enclosure).

Each vertical mounting member may also include one or more mounting flanges which may be coupled to the removable walls in situations in which the removable walls are in use (e.g., coupled to the enclosure). To facilitate mounting and ensure accurate positioning of the removable walls, the removable walls may include one or more recessed surfaces along one or more sides of an exterior surface or interior surface of the removable wall. The recessed surface may interface with the one or more mounting flanges of the vertical mounting member. The mounting flanges may be disposed on opposing sides/portions/edges/vertices of the vertical mounting member at 180°. In some embodiments, the vertical mounting member may additionally, or alternatively, include a contingent mounting flange at 90° to the non-contingent mounting flanges, to facilitate mounting removable walls at a 90° angle to each other (e.g., at a corner).

The removable wall may additionally include various apertures extending from the exterior of the removable wall to the interior of the removable wall, defining an inner cylindrical surface of the removable wall. The various apertures may be utilized for varying purposes, such as mounting, ventilation, fuel ingress. In one embodiment, mounting apertures are provided along the recessed surface of the removable wall. These mounting apertures are spaced such that they align with corresponding mounting apertures found on the mounting flanges of the vertical mounting members. The removable wall may include multiple mounting apertures that each align with one or more corresponding mounting apertures along the mounting flange of the vertical mounting member.

In some embodiments, the aperture may be a ventilation aperture (also referred to herein as an air intake opening). The ventilation aperture may be positioned between two opposing sides of the removable wall (e.g., a left side and a right side). One or more louvers may be disposed between a first side of the ventilation aperture and a second side of the ventilation aperture to direct fluid motion through the ventilation aperture. In some embodiments, a mesh or grating may extend from the first side of the ventilation aperture to the second side of the ventilation aperture (e.g., the left side to the right side) and extend from a third side of the ventilation aperture to a fourth side of the ventilation aperture (e.g., a top side to a bottom side).

In some embodiments, the aperture may be a fuel aperture (also referred to herein as a fuel access). A fuel aperture may be positioned between two opposing sides of the removable walls (e.g., the left side and the right side). In some configurations, the fuel aperture is used to allow ingress and egress of a fuel conduit (e.g., a fuel hose) from an exterior of the enclosure to an interior of the enclosure. The fuel aperture may be positioned, in an exemplary embodiment, along a lower portion of the removable wall when mounted, so as to allow the fuel conduit to be ported through the fuel aperture. The removable wall may additionally include a covering (e.g., a door, flap, slide, etc.) to cover the fuel aperture when not in use.

In some embodiments, a removable wall including a fuel aperture may be constructed from a cementitious material (e.g., reinforced concrete) and oppose a removable wall with a ventilation aperture on an opposing wall of the enclosure system.

Additionally or alternatively, the removable wall may include one or more attachment points (also referred to herein as lifting couplers) for removal and/or placement of the removable wall. In some embodiments, the attachment point may be a hitch located along a top edge/surface of the removable wall when in the mounted position. Suitable hitches may include, but are not limited to, a lift eye, integrated chains, lift bracket, lift aperture, carabiner, and mounting hooks. The one or more attachment points may be positioned along the top edge of the removable wall so as to allow coupling with a lift device (e.g., a crane) to remove the removable wall from the vertical mounting members.

The enclosure may comprise one or more of an enclosed area and an expansion area. In some embodiments, the enclosed area may include an area enclosed by a roof (also referred to herein as a protective covering) and at least four walls (e.g., one or more walls being the removable walls described herein). Within the enclosed area, a plurality of generator mounting pads may be aligned centered (or substantially centered) between two or more adjacent vertical mounting posts. Additionally, one wall (e.g., a non-removable wall) of the enclosure may have coupled (e.g., affixed) to it one or more telemetry subsystems and/or control subsystems. For example, the subsystems coupled to the non-removable wall may include but are not limited to, generator telemetry subsystems, a fire protection subsystem, a transformer subsystem, a building management subsystem, a panel board subsystem, etc. The generator telemetry may provide a singular location to access/view generator telemetry associated with one or more of the generators housed within the enclosed area of the enclosure. The fire protection subsystem may provide fire protection protocols for mitigating damage during a fire event within or around the enclosure. The transformer may provide a step up or step down of the voltage generated from the generator. The building management subsystem may monitor and adjust various parameters related to energy use within the building to which the generators provide electricity. This may include monitoring and controlling heating, ventilation, air conditioning, lighting, power, fire detection, alarms, security systems, elevators, and access controls. The building management subsystem may further manage energy usage within the building by monitoring real-time energy-saving opportunities and implementing energy-saving strategies such as scheduling equipment maintenance. The building management subsystem may also detect faults and abnormal operating conditions and transmit associated fault codes and/or alarms. Likewise, the building management subsystem may offer remote access and control capabilities of the various subsystems coupled to the non-removable wall. The panel board may be used to distribute electrical power from the generators to subsidiary circuits and provide protection against overcurrent and short circuits.

In addition to the enclosed area, the enclosure system may include the expansion area. In some embodiments, the expansion area is neither covered by the roof of the enclosure nor enclosed by removable walls. The expansion area may be preemptively designed and provided to allow for future expansion of the enclosed area. The expansion area may be defined by one or more contingent footers and/or contingent mounting pads. The contingent footers may be distanced from each other as described above with regard to the vertical mounting members. The contingent footers may include an integrated vertical mounting member and/or, in some embodiments, an integrated mounting bracket to which to mount future vertical mounting members. The integrated mounting bracket may be a steel embed plate or other mounting system. Likewise, the expansion area may include one or more contingent mounting pads for future generators.

In at least one implementation of the systems and methods described herein, the enclosed area of the enclosure system may be expanded into the expansion area to enclose at least a portion of the expansion area. To do this, vertical mounting members may be coupled to the contingent footers. A far-end removable wall (located at a far end of the enclosed area and opposite the non-removable wall) may be removed and replaced at a new far end of the new enclosed area, and new removable walls may be placed along opposing sides to fully enclose the new enclosed area, as will be described in greater detail herein, and shown in FIG. 1.

In an example, the building surrounding the enclosed area may be fabricated to provide energy to a data center at year one. At year two, additional energy is needed as the data center's energy needs increase. In order to supply the increased energy need, a wall is removed from the building and moved to the contingent mounting members and additional side walls are added to enclose the new, enlarged enclosed area, thus allowing for expedited placement of an additional generator within the enclosed area. Because the contingent footers and mounting members were previously put in place, the process of expanding the enclosed area is streamlined and cost-effective.

Turning now to FIG. 1, a system 100 is shown for enclosing a plurality of energy converting equipment. The system 100 may include an enclosed area 101 and an expansion area 103. The enclosed area 101 may include mounting member 102*a*, 102*b*, 102*c*, 102*d*, 102*e*, 102*f*, 102*g*, 102*h*; a telemetry enclosure panel 104; an expansion modular enclosure panel 106; a modular enclosure panel 108*a*, 108*b*, 108*c*, 108*d*, 108*e*, 108*f*; a pad 110; a generator 112; a muffler 114; an out vent 116; various subsystems (e.g., a fire protection subsystem 118, a building management subsystem 120, a transformer subsystem 122, and a panel board subsystem 124); one or more heaters 126 (configured to provide heating to the enclosed area); one or more sprinkler lines 140 coupled together at one or more nodes, such as node 142; and/or a support surface 162. The expansion area 103 may include contingent footings 134*a*, 134*b*, contingent mounting members 136*a*, 136*b*, and/or a contingent pad 138 for future expansion of the enclosed area 101. in other embodiments, a pad may be provided that covers all or a large portion of the enclosed area 101 and/or the expansion area 103 so that individual pads, such as pad 110, or contingent pad 138, are not needed.

The system 100 may include the enclosed area 101 and the expansion area 103 to provide an enclosure with future expandability and adaptability. For example, a size of the enclosed area 101 may be enlarged by adding modular enclosure panels (e.g., a contingent modular enclosure panel 144*a*, 144*b*) or reduced by removing modular enclosure panels (e.g., modular enclosure panel 108*c*, 108*f*). Likewise, the expansion modular enclosure panel 106 may be moved to a location corresponding to the farthest reaching modular enclosed panel. The expansion area 103 may additionally or alternatively include one or more contingent pads, such as contingent pad138 for future generators.

The generator 112 may be any energy conversion device but is referred to herein as a generator for ease of description. However, in some embodiments, the generator 112 may alternatively be a turbine, a heat exchanger, a transformer, a generator (e.g., diesel, gasoline, natural gas, electric), a combustion engine, a hydroelectric turbine, a wind turbine, a steam boiler, batteries, fuel cell (e.g., hydrogen fuel cell), and/or a hot water boiler. The generator 112 may be mounted to the pad 110 to secure the generator 112 from translational and vertical movement of the generator 112 during operation. Generators 112 often experience large vibrational forces during operation and can result in movement in relation to the support surface 162. To avoid this relational movement, the generator 112 is bolted or otherwise affixed to the pad 110. Vibration-reducing brackets (such as motor mounts) may be used to mount the generator 112 to the pad 110. In some embodiments, the generator 112 is directly coupled to the pad 110 such as with concrete anchors or other fasteners. In an exemplary embodiment, the pad 110 may be a cementitious matrix with aggregates (e.g., fibers) and/or reinforcing materials (e.g., rebar) disposed within the cementitious matrix for increased tensile strength. Additionally or alternatively, the pad 110 may include of one or more metal components, such as a steel frame or rebar. The pad 110 may be made of a petroleum-based mix, such as asphalt. In some embodiments, the pad 110 may be a rubber composite. Likewise, the pad 110 may be composed of any number of combinations of the above-referenced materials. By way of example, the pad 110 may include a prefabricated reinforced cementitious slab with a steel frame bolted to it. The steel frame may have rubber composite mounting brackets for coupling to the generator 112.

The system 100 may include generator 112 spaced, in some embodiments, equidistant apart from one or more other generators. Each generator 112 may be mounted to a pad 110. Each pad 110 (and by consequence, each generator 112) may be positioned within the system 100 in a predetermined location to facilitate ingress and egress of the generator 112 into and out of the enclosed area 101. In an exemplary embodiment, the generator 112 may ingress into the enclosed area 101 along the path 146, entering an opening left by a modular enclosure panel 108*a* or modular enclosure panel 108*d* removed from its installed position. Likewise, the generator 112 may egress from the enclosed area 101 along the path 146 through the opening left by the modular enclosure panel 108*a* or modular enclosure panel 108*d* removed from its installed position.

In order to allow for ingress and egress of the generator 112, the mounting member 102*a* and the mounting member 102*b* (e.g., adjacent mounting members) may be spaced a predefined distance 148 apart from each other, and/or a predefined distance 150 orthogonally from the path 146 to the mounting member 102*b*. The predefined distance 148 between adjacent mounting members (e.g., the mounting member 102*a* and the mounting member 102*b*) may be greater (e.g., wider) than the generator 112 at its widest point by a clearance threshold 152 on each side of the generator 112, thus allowing ingress and egress of the generator 112 with sufficient clearance. The predefined distance 148, 150, and the clearance threshold 152 may be measured to a middle of the mounting member 102*a* or to an outer surface of the mounting member 102*a*. The clearance threshold 152 may be a discrete distance (e.g., 5 feet) or may be a percentage of the width of the generator 112 at the widest part. For example, the clearance threshold 152 may be 10% the width of the generator 112. Thus, if the generator 112 is 10-feet wide, the clearance threshold 152 may be 1 foot on either side of the generator 112 or alternatively, 1 foot total longer than the generator 112. While a single generator, such as generator 112 is shown between the mounting member 102*a* and the mounting member 102*b*, it is understood that multiple generators, such as generator 112 may be positioned between the mounting member 102*a* and the mounting member 102*b*. In such embodiments, the predefined distance 148 remains an amount that allows for ingress and/or egress of any generator 112 with the removal of only a single removable wall (e.g., modular enclosure panel 108*a*).

The mounting member 102*c* may be positioned at the predefined distance 148 from the mounting member 102*b*. Likewise, mounting member 102*d* may be positioned at the predefined distance 148 from the mounting member 102*c*. While mounting members 102*a*, 102*b*, 102*c*, 102*d* are illustrated as spaced equidistant (e.g., at the predefined distance 148) between adjacent members, it should be understood that the mounting members 102*a*, 102*b*, 102*c*, 102*d* may be spaced apart at differing distances. However, regardless of the distance between the mounting members 102*a*, 102*b*, 102*c*, 102*d*, in exemplary embodiments, the spacing is sufficient to allow ingress and/or egress of the generators 112 provided along the path 146 between adjacent mounting members to a corresponding pad. Likewise, the contingent footing 134*a* may be spaced at the predefined distance 148 from the footings 132*d* to allow for future ingress and/or egress of a generator between the mounting members 102*d* and a contingent mounting member 136*a*.

The mounting members 102*a*, 102*b*, 102*c*, 102*d* may be considered a first plurality of mounting members and may define a first wall of the enclosed area 101 (e.g., a south wall 154). While the terms north, south, east, and/or west may be used for ease of description while referring to the figures, it is understood that these are merely shorthand references to directions as if viewing the figures with the direction north at the top of the figure(s), and in no way refers to actual geographic directions and should not be considered limiting in any way. The first plurality of mounting members may be placed substantially collinearly to each other. In other words, each of the mounting members 102*a*, 102*b*, 102*c*, 102*d* may be located substantially along a single line, the line defining a shape of the south wall 154. The contingent footing 134*a* may be positioned along the line so as to be colinear with the mounting members 102*a*, 102*b*, 102*c*, 102*d*.

A second plurality of mounting members may be comprised of the mounting members 102*e*, 102*f*, 102*g*, 102*h* and may define a second wall of the enclosed area 101 (e.g., a north wall 156), the north wall 156 being substantially parallel to the south wall 154. As with the first plurality mounting members, the second plurality of mounting members may be positioned substantially collinearly to each other. In other words, each of the mounting members 102*e*, 102*f*, 102*g*, 102*h* may be located substantially along a single line, the line defining a shape of the north wall 156. The contingent footing 134*b* may be positioned along the line so as to be colinear with the mounting members 102*e*, 102*f*, 102*g*, 102*h*.

The placement of each of the second plurality of mounting members may correspond to the placement of each of the first plurality of mounting members. In other words, the second plurality of mounting members may be spaced at the predefined distance 148 from adjacent mounting members. Indeed, an opposing mounting members pair (e.g., the mounting member 102*a* and mounting member 102*e*; the mounting member 102*b* and the mounting member 102*f*; the mounting member 102*c* and the mounting member 102*g*; the mounting member 102*d* and the mounting member 102*h*; the contingent mounting member 136*a* and the contingent mounting member136*b*) may be positioned in line with each other, such that the corner mounting members (e.g., the mounting member 102*a*, the mounting member 102*d*, the mounting member 102*e* and the mounting member 102*h*) define a rectangular outer perimeter of the enclosed area 101. While the shape of the system 100 is shown as being a rectangular, it should be understood that any suitable shape of the system 100 may be used, such as a parallelogram, a rhombus, a trapezoid, a circle, an oval, a square, etc. Opposing modular enclosure panels (e.g., the modular enclosure panel 108*a* and the modular enclosure panel 108*d*; the modular enclosure panels 108*b* and the modular enclosure panels 108*e*; the modular enclosure panel 108*c* and the modular enclosure panel 108*f*) may be substantially parallel to each other, such that the south wall 154 is substantially parallel to the north wall 156.

As will be described in more detail in FIGS. 3, 4A, 4B, 4C, and 5, the modular enclosure panel 108*a* may include a fuel access 130 for passing a fuel conduit (e.g., a fuel hose) through the modular enclosure panel 108*a*. In similar fashion, one or more of the modular enclosure panels 108*b*, 108*c* may also include a fuel access. In some embodiments, the modular enclosure panels 108*d*, 108*e*, 108*f* may also each include a fuel access 130. However, in an exemplary embodiment, only the modular enclosure panels 108*a*, 108*b*, 108*c* along the south wall 154 include fuel access openings. The fuel access 130 may be covered by a movable access cover (as shown in FIGS. 4A-4C) coupled to the modular enclosure panel 108*a*. In a first position, the movable access cover may cover all or some of the fuel access 130 and prevent intrusion through the fuel access 130. In a second, selectable position, the movable access barrier may reveal the fuel access 130 and allow intrusion (e.g., placement of the fuel hose) through the fuel access 130.

The modular enclosure panel 108*a* may be made of a cementitious matrix with fibrous or reinforcing materials within the cementitious matrix. In other embodiments, the modular enclosure panel 108*a* may be provided of known or available material that may provide a derived mechanical, thermal, and/or sound proof property. In some embodiments, the south wall 154 is an exterior of a compound.

Figures 4A, 4B, 4C:
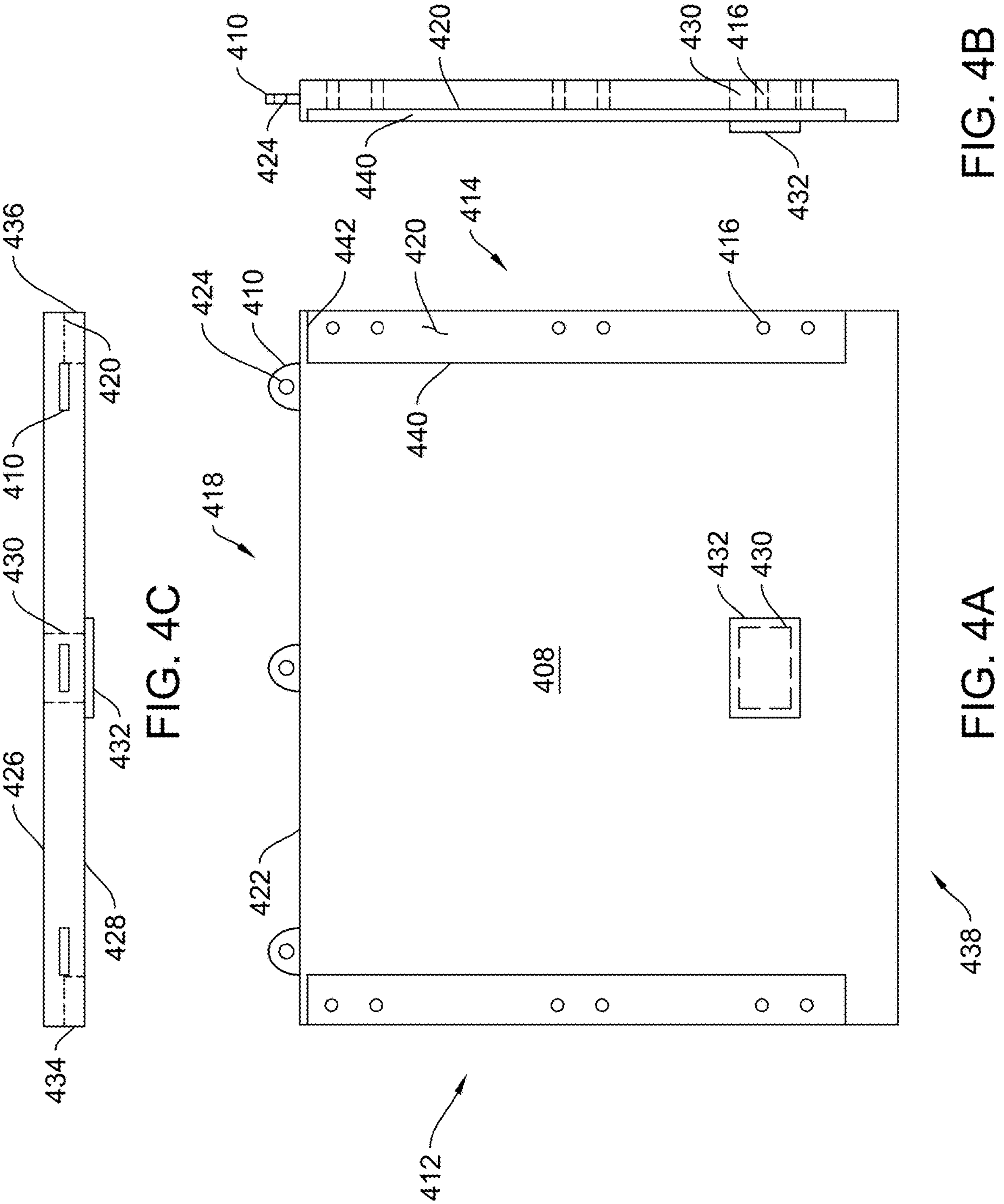
FIG. 4A is a front-view of an enclosure panel, according to an embodiment.
FIG. 4B is a side-view of an enclosure panel, according to an embodiment.
FIG. 4C is a top-view of an enclosure panel, according to an embodiment.
Figure 5:
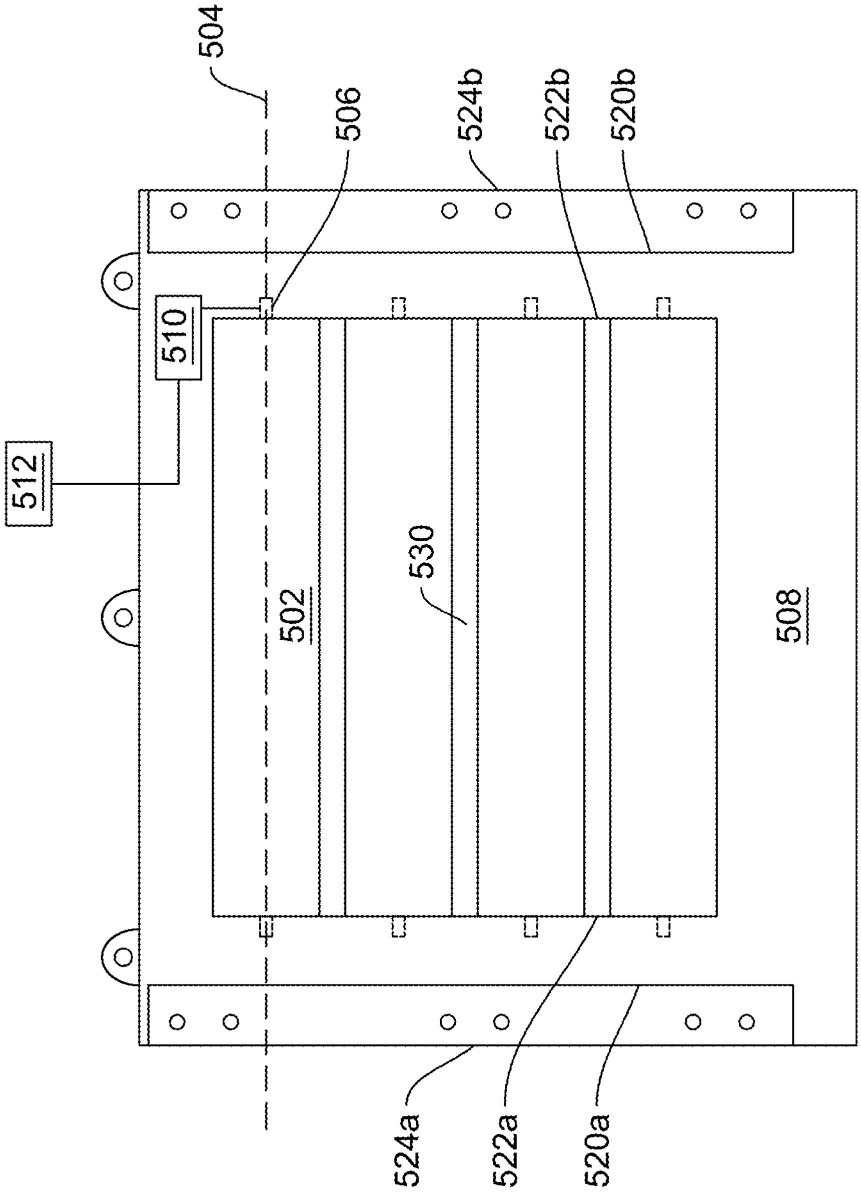
FIG. 5 is a front-view of an enclosure panel, according to an embodiment.

As will be described in more detail in FIGS. 3, 4A, 4B, 4C, and 5, the modular enclosure panel 108*d* may include an air intake opening 158 for allowing a fluid (e.g., air 160) to enter the enclosed area 101 through the modular enclosure panel 108*d*. In similar fashion, one or more of the modular enclosure panels 108*e*, 108*f* may also include an air intake opening 158. In some embodiments, the modular enclosure panels 108*a*, 108*b*, 108*c* may also each include an air intake opening 158. However, in an exemplary embodiment, only the modular enclosure panels 108*d*, 108*e*, 108*f* include air intake openings. The air intake opening 158 may include one or more louvers stretching across the air intake opening 158 (as shown in FIG. 5). The louvers may be selectably positionable between a first position (e.g., a closed position) and a second position (e.g., an opened position). The louvers, in certain embodiments, may be electromechanically actuated by an electromechanical actuator, such as by a motor (e.g., a stepper motor or servo motor). The electromechanical actuator may be coupled to a shaft running through the louvers and extending into the modular enclosure panel 108*d*, or to a mounting bracket coupled thereto.

Upon the air 160 entering the enclosed area 101, the air 160 may pass over a radiator apparatus of the generator 112 for cooling the generator 112. The generator 112 may have additional or alternative cooling systems in place, such as a liquid cooling system. Additionally or alternatively to cooling, the air 160 may be used during a combustion cycle of the generator 112. The exhaust of the combustion cycle of the generator 112 may be fluidly transmitted through the muffler 114. In some embodiments, the muffler 114 may extend from an exhaust port of the generator 112 through the protective covering (e.g., the roof) of the enclosed area 101. In some embodiments, the muffler 114 does not extend through the protective covering of the enclosed area 101. In such embodiments, the muffler 114 may extend to the exterior of the enclosed area 101 through one or more modular enclosure panels, such as modular enclosure panel 108*a*, 108*d*. Likewise, the muffler 114 may extend through the telemetry enclosure panel 104.

The muffler 114 may comprise piping from the exhaust of the generator 112 and may include a series of chambers and baffles through which exhaust gases pass before exiting. As exhaust gases flow through the muffler 114, they encounter various obstacles and surfaces that cause sound waves to bounce and collide, thereby canceling out some of the noise generated by the generator 112. Additionally, the muffler 114 may contain sound-absorbing materials, such as fiberglass or metal wool, which further dampen exhaust noise. By dissipating and redirecting sound waves, the muffler 114 helps to minimize the loudness of the generator 112's exhaust, resulting in an enclosed area 101 that is quieter and more comfortable for operators and reducing noise pollution in the surrounding environment. In some embodiments, each generator 112 may include more than one muffler, such as muffler 114.

Additionally or alternatively, the out vent 116 extends from the generator 112 through the protective covering. The out vent 116 may be made of suitable ductwork to transport the air 160, after being heated by the generator 112, out of the enclosed area 101. As the air 160 passes into the enclosed area 101 and over the generator 112 it is heated. This air 160, after being heated, may be expelled from the enclosed area 101 through the out vent 116 which vertically extends from a rear side of the generator 112 up through the protective covering. As with the muffler 114, the out vent 116 need not pass through the protective covering. In such embodiments, the out vent 116 may pass through one or more modular enclosure panels, such as modular enclosure panel 108*a*, 108*d*. In some embodiments, the out vent 116 may pass through the telemetry enclosure panel 104. In some embodiments, the out vent 116 may include a fan or other mechanical fluid accelerator to force the air 160 through the out vent 116 out of the enclosed area 101.

The fire protection subsystem 118, the building management subsystem 120, the transformer subsystem 122, and/or the panel board subsystem 124 may be communicatively coupled to one or more of the other subsystems and/or the generator 112 (and other energy conversion devices within the enclosed area 101). The telemetry enclosure panel 104 provides a singular location to access some or all telemetry and controls of the various systems associated with the generator 112 and the enclosed area 101, both internal and/or external to the enclosed area 101. In an exemplary embodiment, but not all embodiments, the telemetry enclosure panel 104 is a non-removable enclosure panel. In other words, it is not configured to be removed to expand the enclosed area 101. Rather, when expanding and/or reducing the size of the enclosed area 101, the expansion modular enclosure panel 106 is moved. In such embodiments, the expansion modular enclosure panel 106 is configured as a removable modular enclosure panel, such as the modular enclosure panel 108*a*, 108*b*, 108*c*, 108*d*, 108*e*, 108*f*.

The modular enclosure panel 108*a* extends vertically up (towards the protective covering above the enclosed area 101) from the support surface 162 and horizontally from the mounting members 102*a* to the mounting members 102*b*. The mounting members 102*a*, as described in more detail in FIG. 3, extends from a footing 132*a*. Likewise, the mounting members 102*b*, 102*c*, 102*d*, 102*e*, 102*e*, 102*f*, 102*g*, 102*h* extend from footings 132*b*, 132*c*, 132*d*, 132*e*, 132*f*, 132*g*, 132*h*, respectively. The footing 132*a* is described, and such description may be applied to each of the footings 132*b*, 132*c*, 132*d*, 132*e*, 132*f*, 132*g*, 132*h* and the contingent footings 134*a*, 134*b*. The footing 132*a* may be a cementitious footer extending into the support surface 162. Within the footing 132*a* may be mounted an embed steel plate or other bracketing member to which to couple the mounting members 102*a*. In some embodiments, the mounting members 102*a* is directly coupled to the footing 132*a*, such as with concrete anchors.

To prevent movement of the pad 110 in relation to the support surface 162, the pad 110 may additionally include footings or anchors into the support surface 162. The support surface 162 may be a cementitious slab, such as the pad 110. In such embodiments, the support surface 162 may include a fibrous substrate or strengthening material (e.g., rebar) within the cementitious matrix. The support surface 162 may also include contraction lines to relieve stresses within the support surface 162. In some embodiments, the support surface 162 may comprise an aggregate substrate, such as gravel. The support surface 162 may include multiple types of aggregate substrate. For example, the support surface 162 may include a first base layer of geo-textile membrane, a 100-150 mm layer of quality granular hardcore, and/or 20-100 mm of gravel.

The fire protection subsystem 118 may be communicatively coupled to the one or more sprinkler lines 140 and/or the one or more nodes, such as node 142. The fire protection subsystem 118 may be configured to detect, suppress, and mitigate fires. It may include a range of equipment, systems, and protocols aimed at safeguarding the enclosed area 101 and the equipment inside the enclosed area 101 (e.g., the generator 112). The fire protection subsystem 118 may include fire detection devices such as smoke detectors, heat sensors, and flame detectors, which may be strategically placed throughout the enclosed area 101 and surrounding environment to alert occupants and emergency responders to the presence of a fire. Additionally, automatic fire suppression systems such as one or more sprinkler lines 140, foam systems, or gas-based extinguishing systems may be installed to suppress fires rapidly and prevent their spread. The fire protection subsystem 118 may also include manual fire-fighting equipment such as fire extinguishers, fire hoses, and hydrants, providing occupants with the means to combat small fires or assist in evacuation efforts. Furthermore, fire alarm and communication systems are integrated into the fire protection subsystem 118 to facilitate evacuation and emergency response coordination.

As with modular enclosure panels, the fire protection subsystem 118 may include various contingent members that may facilitate the expansion and reduction of the enclosed area. for example, each node 142 may include a fitting or other coupling mechanism for plugging the flow of the fire suppression system and/or coupling to a new sprinkler line. Each node 142 may be located (e.g., along a ceiling of the enclosed area 101) such that an expansion or reduction of the enclosed area 101 only requires the removal of a sprinkler line at a single node. In some embodiments, as shown in FIG. 1, each node 142 may be located between generators offset from corresponding vertical mounting members (e.g., mounting members 102*b* and mounting members 102*f*).

The building management subsystem 120 may be configured to monitor, manage, and optimize various mechanical, electrical, and security systems. Within the system 100, the building management subsystem 120 may serve as a central control system of the system 100, allowing facility managers to remotely monitor and control critical building functions such as heating, ventilation, air conditioning (HVAC), lighting, power distribution, fire detection and suppression, security access, and environmental monitoring. The building management subsystem 120 may be communicatively coupled to one or more of the generators 112, subsystems (e.g., fire protection subsystem 118, transformer subsystem 122, panel board subsystem 124) and other telematics or control systems within the enclosed area 101 and associated buildings. By collecting and analyzing real-time telemetry and data from sensors and devices throughout and surrounding the enclosed area 101, the building management subsystem 120 can identify inefficiencies, detect faults or abnormalities, and automatically adjust system settings to optimize energy usage, occupant comfort, and/or building performance. Additionally or alternatively, the building management subsystem 120 provides facilities managers with access to reports, analytics, and dashboards, enabling informed decision-making, predictive maintenance, and proactive troubleshooting. With its ability to integrate and coordinate diverse building systems, the building management subsystem 120 helps streamline operations of the generator 112, reduce energy consumption and costs of buildings associated with the enclosed area 101, enhance occupant comfort and safety, and prolong the lifespan of building equipment, such as the generator 112.

The transformer subsystem 122 may be used within the system 100 to facilitate the efficient transmission of electricity. It may be used to convert alternating current (AC) electrical energy generated by the generator 112 from one voltage level to another, either increasing (step-up transformer) or decreasing (step-down transformer) the voltage. This process of voltage transformation is used for transmitting electricity through various buildings with minimal loss and ensuring compatibility between different voltage levels within buildings associated with the enclosed area 101. The building management subsystem 120 may include two or more coils of wire, known as windings, wound around a magnetic core made of iron or other magnetic materials. By varying the number of turns in each winding, transformers can step up or step down the voltage while maintaining the power (voltage×current) at a constant level. In addition to voltage transformation, transformers also provide isolation between different parts of the electrical system of the enclosed area 101 and protect against overvoltage and short circuits.

The panel board subsystem 124, such as a distribution board or breaker panel, serves as a hub for controlling and distributing electrical power within the enclosed area 101 and associated buildings. It may receive electrical power from the main electrical supply (e.g., the grid and/or the generator 112) and distribute it to various circuits throughout the building, such as lighting, receptacles, appliances, and HVAC systems. The panel board subsystem 124 may contain multiple circuit breakers or fuses, each dedicated to protecting a specific electrical circuit from over currents and short circuits. These protective devices automatically interrupt the flow of electricity when abnormal conditions occur, preventing damage to wiring and equipment and minimizing the risk of electrical hazards such as fires and electric shocks.

As with the fire protection subsystem 118, one or more of the various subsystems described herein may be centrally located within the enclosed area 101 and facilitate expansion or reduction of the enclosed area 101. This may include systems and/or control modules that may be configured to receive a control or signal wire from a newly placed generator and thus provide telemetry and/or control of the newly added generator without installation of a new control module.

While the generators in FIG. 1 are illustrated as spaced apart from each other horizontally along a width of the enclosed area 101 (e.g., between the telemetry enclosure panel 104 and the expansion modular enclosure panel 106), in various embodiments the generators may be stacked vertically in a multi-story arrangement. In such embodiments, one or more additional stories may be added to the system 100 and be located within the enclosed area 101. The modular enclosure panels 108*a*, 108*b*, 108*c*, 108*d*, 108*e*, 108*f* may span vertically from the support surface 162 to the roof, thus spanning one or more stories of the system 100. In other embodiments, a first set of modular enclosure panels may be used along the first floor of the system 100 and a second set of modular enclosure panels may be used along the second floor, and so on. In any case, in various embodiments, in order to access (e.g., remove/insert) a generator, only a single modular enclosure panel need be removed.

In some embodiments, the modular enclosure panels (such as those found on either on the first or second floor) may include additional features along an interior or exterior edge to facilitate the expansion or reduction of the enclosed area 101, such as a staircase, a catwalk, plumbing systems, electrical systems, and so on. The control systems of the generators on the additional story may be located along the telemetry enclosure panel 104 on the first floor, as described herein, or may be separately located on a separate telemetry enclosure panel on the additional story. Likewise, the control centers of the various other subsystem modules (e.g., the fire protection subsystem, building management subsystem, transformer subsystem, and/or panel board subsystem) may be centrally located along the telemetry enclosure panel 104 on the first floor or alternatively, one or more of the subsystem modules may be split across the various floors of the system 100.

Figure 2:
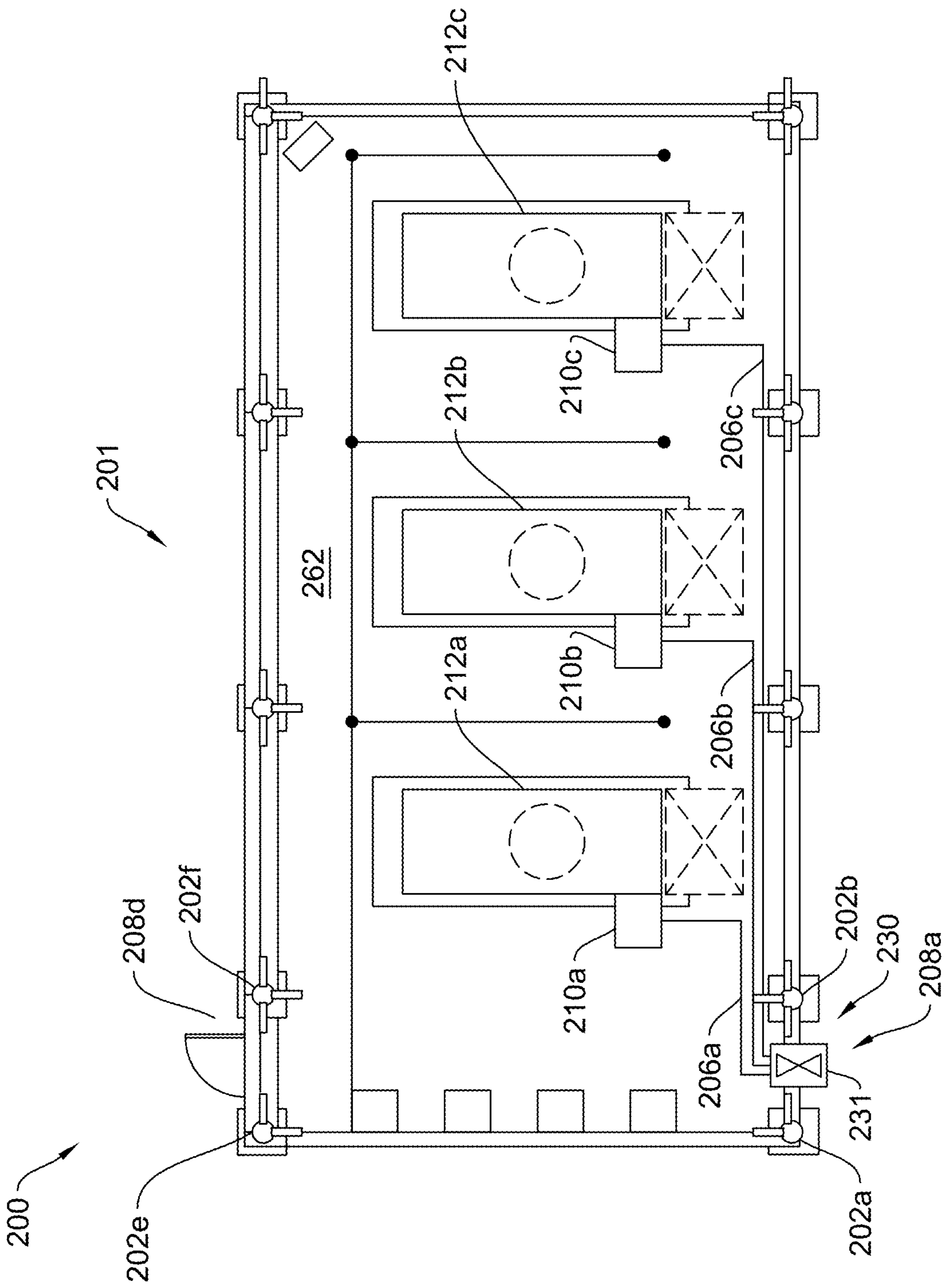
FIG. 2 is a top-view of a modular enclosure, according to an embodiment.

Turning now to FIG. 2, a system 200 of a modular enclosure is shown. The system 200 may be substantially similar to the system 100 of FIG. 1 with various distinguishing elements, as described herein. Similar to FIG. 1, FIG. 2 includes multiple modular enclosure panels 208*a*, 208*d* coupled to multiple mounting members 202*a*, 202*b* and mounting members 202*e*, 202*f*, respectively. However, the multiple modular enclosure panels 208*a*, 208*d* may be configured to be non-removable in some embodiments. By way of example, the modular enclosure panel 208*a* may be a non-removable enclosure panel with a selectable fuel distribution device 230 (e.g., a multi-port valve) for selectably routing a fluid (e.g., fuel, such as diesel) from the selectable fuel distribution device 230 to one or more of the generators 212*a*, 212*b*, 212*c* (e.g., to an associated fluid reservoir of the generators 212*a*, 212*b*, 212*c*). In an embodiment, each generator 212*a*, 212*b*, 212*c* may have a corresponding liquid-tight fluid reservoir 210*a*, 210*b*, 210*c* for storing a fuel for the respective generators 212*a*, 212*b*, 212*c*. In some embodiments, the fuel is diesel or gasoline. In some embodiments, the fuel is oil. In other embodiments, the fuel is natural gas or propane. The fluid reservoir may be located below or proximate to the corresponding generator and be fluidly coupled to the corresponding generator so as to provide the corresponding generator with the fuel stored within the fluid reservoir.

The selectable fuel distribution device 230 may include one or more ports for selectably routing the fluid to the one or more generators 212*a*, 212*b*, 212*c*. The selectable fuel distribution device 230 may include a fuel hose hookup 231 on an exterior of an enclosed area 201 of the system 200. A fuel hose or other fuel conduit may be coupled to the selectable fuel distribution device 230 at the fuel hose hookup 231. The fuel hose hookup 231 may have a locking mechanism to engage with a first end of the fuel hose. In some embodiments, the fuel hose hookup 231 is an opening larger than the first end of the fuel hose in which the fuel hose is placed. The selectable fuel distribution device 230 may include a lever or other actuating mechanism to select which generators 212*a*, 212*b*, 212*c* to supply fuel.

The lever or other actuating mechanism may be used to adjust a routing within the selectable fuel distribution device 230 of received fuel from a first path (e.g., along a first fluid conduit 206*a* to a fluid reservoir 210*a* associated with the generator 212*a*), to a second path (e.g., along a second fluid conduit 206*b* to a fluid reservoir 210*b* associated with the generator 212*b*), or to a third path (e.g., along a third fluid conduit 206*c* to a fluid reservoir 210*c* associated with the generator 212*c*). While multiple fluid conduits 206*a*, 206*b*, 206*c* are shown in FIG. 2, it should be understood that there may be a single fluid conduit fluidly coupled to the selectable fuel distribution device 230 with various branches extending to the fluid reservoirs 210*a*, 210*b*, 210*c*. The fluid reservoirs 210*a*, 210*b*, 210*c* coupled to the fluid conduit 206*a*, 206*b*, 206*c* are shown proximate the generators 212*a*, 212*b*, 212*c* for illustrative purposes, and it should be understood that the fluid reservoirs 210*a*, 210*b*, 210*c* may be positioned anywhere within or without the enclosed area 201. Indeed, the fluid reservoirs 210*a*, 210*b*, 210*c* may be positioned anywhere while being fluidly coupled to the respective generators 212*a*, 212*b*, 212*c* to provide the generators 212*a*, 212*b*, 212*c* with the fuel stored within the fluid reservoirs 210*a*, 210*b*, 210*c*. In an exemplary embodiment, the fluid reservoirs 210*a*, 210*b*, 210*c* are positioned under, adjacent, and/or proximate the generators 212*a*, 212*b*, 212*c*. In some embodiments, a single fluid reservoir 210*a* may be used to supply fuel to each of the generators 212*a*, 212*b*, 212*c*.

In an exemplary embodiment, three fluid conduits (e.g., the first fluid conduit 206*a*, the second fluid conduit 206*b*, and the third fluid conduit 206*c*) are coupled to the selectable fuel distribution device 230 to route fuel from the selectable fuel distribution device 230 to one or more of the fluid reservoirs 210*a*, 210*b*, 210*c*. By way of example, a first end of the first fluid conduit 206*a* is fluidly coupled to a first port of the selectable fuel distribution device 230 and a second end of the first fluid conduit 206*a* is fluidly coupled to the fluid reservoir 210*a* of the generator 212*a*. A first end of the second fluid conduit 206*b* is fluidly coupled to a second port of the selectable fuel distribution device 230 and a second end of the second fluid conduit 206*b* is fluidly coupled the fluid reservoir 210*b* of the generator 212*b*. A first end of the third fluid conduit 206*c* is fluidly coupled to a third port of the selectable fuel distribution device 230 and a second end of the third fluid conduit 206*c* is fluidly coupled to a fluid reservoir 210*c* of the generator 212*c*. The selectable fuel distribution device 230 may also include one or more telemetry gauges (e.g., digital or analog) for indicating a fuel level of each of generators 212*a*, 212*b*, 212*c* (or the corresponding reservoirs). For example, the selectable fuel distribution device 230 may include three fuel gauges, a first fuel gauge to indicate a fuel level of the generator 212*a* (or the fluid reservoir 210*a*), a second fuel gauge to indicate a fuel level of the generator 212*b* (or the fluid reservoir 210*b*), and/or a third fuel gauge to indicate a fuel level of the generator 212*c* (or the fluid reservoir 210*c*). The one or more fluid conduits 206*a*, 206*b*, 206*c* may be hard plumbed into the enclosed area 201. In some embodiments, the fluid conduit 206*a* is plumbed in a support surface 262 of the enclosed area 201. In other embodiments, the fluid conduit 206*a* is plumbed along a protective covering of the enclosed area 201. In other embodiments, the fluid conduit 206*a* is plumbed along one or more modular enclosure panels.

While the selectable fuel distribution device 230 is shown as a multi-port valve, it is understood that in some embodiments, the routing of the fuel through the single fluid conduit 206*a* may occur at various points along the fuel conduit 206*a* to fill the various reservoirs 210*a*, 210*b*, 210*c*. These selectably positionable valves may be controlled from a central control unit located at, in, or near the selectable fuel distribution device 230.

Figure 3:
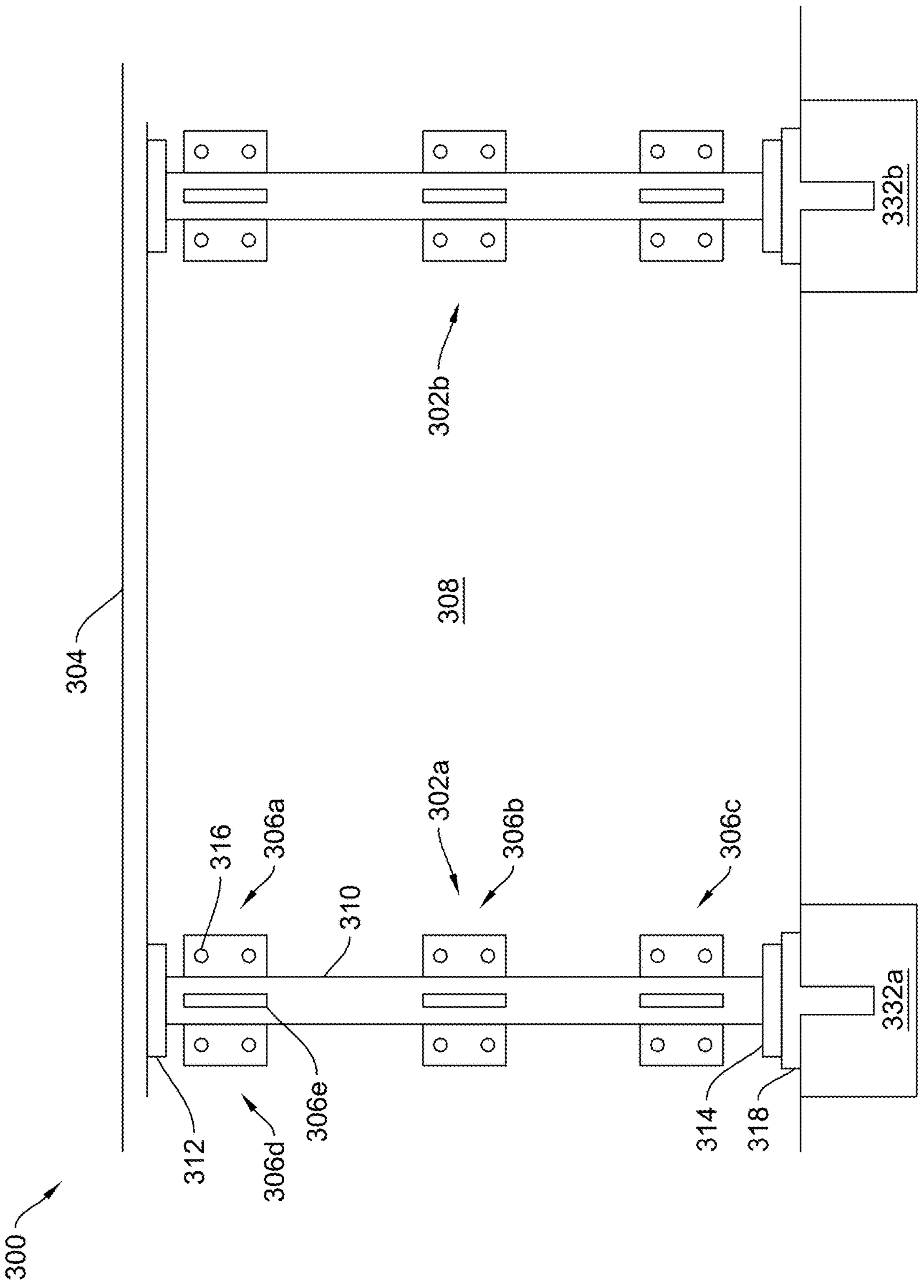
FIG. 3 is a front-view of a plurality of mounting members coupled to an enclosure panel, according to an embodiment.

Turning now to FIG. 3, an interior view of a system 300 is shown. In other words, FIG. 3 illustrates a view of a modular enclosure panel 308 (e.g., modular enclosure panel 108*b* of FIG. 1) from the interior of an enclosed area (e.g., the enclosed area 101 of FIG. 1). The system 300 of FIG. 3 may include a mounting member 302*a*, 302*b*, at least one support member 304, and a modular enclosure panel 308. The mounting member 302*a* may include various flanges 306*a*-306*d*, a contingent flange 306*e*, vertical member 310, a top plate 312, and/or a base plate 314.

The vertical member 310 of the mounting member 302*a* may be any construction member made of steel, fiber, composite, metal, wood, or other construction material. The vertical member 310 may be an extruded metal post, beam, stud, etc. In an exemplary embodiment, the vertical member 310 is steel square or round tubing, hollow or solid.

The mounting member 302*a* may include various mounting flanges, such as a flange 306*a*, 306*b*, 306*c*, 306*d*. The mounting flange 306*a* and the mounting flange 306*b* are positioned, in some embodiments, 180° to each other on opposing sides of the vertical member 310. The flange 306*a* may be coupled to the vertical member 310 such as by weld, adhesive, and/or fastener. The flange 306*a* may be coupled to the vertical member 310 by various welding means including arc welding, resistance welding gas welding, laser welding, electron beam welding, friction welding, and ultrasonic welding. The flange 306*a* may be coupled to the vertical member 310 by various fasteners such as, but not limited to, screws, bolts, nuts, washers, rivets, nails, anchors, staples, pins, clips, clamps, wedges, hooks, threaded inserts, toggle bolts, eye bolts, U-bolts, expansion bolts, T-nuts, and studs. In some embodiments, the flange 306*a* is manufactured as part of the vertical member 310 as a single unit.

The flange 306*a* may include at least one mounting aperture 316. In some embodiments, the at least one mounting aperture 316 is defined by an inner surface of the flange 306*a*. The inner surface may define a right cylinder through the flange 306*a* from a first surface to a second surface. In some embodiments, the at least one mounting aperture 316 is threaded. In some embodiments, the at least one mounting aperture 316 is not threaded. The at least one mounting aperture 316 is positioned on the flange 306*a* so as to interface/align with a corresponding mounting aperture of the modular enclosure panel 308 (e.g., a mounting aperture 416 of FIG. 4A) when the modular enclosure panel 308 is mounted to the mounting member 302*a*. Each flange 306*a*-306*d* of FIG. 3 may have one or more mounting apertures 316 that correspond/align in position, when mounted, to a corresponding mounting aperture in the modular enclosure panel 308 such that the mounting apertures substantially align with each other. In at least one embodiment, the modular enclosure panel 308 is coupled to the mounting member 302*a* through tightened fasteners passing through the aligned mounting aperture 316 and corresponding mounting aperture of the modular enclosure panel 308. In some embodiments, the mounting aperture of the modular enclosure panel 308 and/or the mounting aperture 316 may have an asymmetrical shape (e.g., a keyway included) to allow a fastener (e.g., a carriage bolt) to lock into position and facilitate removal of the fastener with access to a single side of the modular enclosure panel 308. By way of example, a carriage bolt (or other male-threaded fastener) may pass through (from the exterior of the modular enclosure panel 308) the mounting aperture of the modular enclosure panel 308 and through the corresponding at least one mounting aperture 316 of the mounting member 302*a*. The mounting aperture of the modular enclosure panel 308 may have a square profile to interface with a square shoulder of the carriage bolt. With the carriage bolt in the installed position (e.g., positioned through both the mounting aperture of the modular enclosure panel 308 and the mounting aperture 316), a female-threaded fastener (e.g., a nut) may be coupled to the carriage bolt and tightened to a specified torque amount. This process of installation may be repeated for any or all of the remaining mounting apertures of the mounting member 302*a*.

The mounting member 302*a* may additionally or alternatively include a contingent flange 306*e*. The contingent flange 306*e* may be coupled to the vertical member 310 at a position between the corresponding mounting flange 306*a* and mounting flange 306*b*. In an exemplary embodiment, the contingent flange 306*e* is coupled to the vertical member 310 at 90° (e.g., perpendicular) to one or both of the mounting flange 306*a* and the mounting flange 306*b*, as shown in FIG. 3. In some embodiments, each mounting member 302*a* includes a contingent flange 306*e*. In some embodiments, one or more of the mounting members (e.g., the mounting member 302*b*) do not include a contingent flange 306*e*. Similar to the contingent pad 138 and the contingent mounting member 136*a* of FIG. 1, the contingent flange 306*e* may be used when expanding and/or reducing an enclosed area of a modular enclosure (e.g., the enclosed area 101 of FIG. 1). The contingent flange 306*e* may include mounting apertures (not shown in FIG. 3) similar to the mounting aperture 316 of the flange 306*a*.

By way of example, and returning to FIG. 1 for illustrative purposes, the mounting member 102*h* may include a contingent flange 164*h* to which the expansion modular enclosure panel 106 is coupled. Likewise, the mounting members 102*d* may also include a contingent flange 164*d* to which the expansion modular enclosure panel 106 is coupled to. The mounting member 102*h* may also include a flange 166*h* to which the modular enclosure panel 108*f* is coupled, and an unused flange 168*h* to which the contingent modular enclosure panel 144*b* (upon placement) may be coupled during the expansion of the enclosed area 101 into the expansion area 103.

In similar fashion, the mounting member 102*c* and the mounting members 102g may each include a contingent flange 164*c*, 164*g*, respectively, positioned at 90° (within the enclosed area 101) between the flanges (e.g., contingent flange 164*g* positioned between flanges 166*g*, 168*g*) which are used in the illustrated configuration (e.g., to couple to the modular enclosure panel 108*e* and the modular enclosure panel 108*f*; and to couple to the modular enclosure panel 108*b* and the modular enclosure panel 108*c*, respectively). Upon removal of the modular enclosure panel 108*f* and modular enclosure panel 108*c* (e.g., during a reduction of the enclosed area 101), the expansion modular enclosure panel 106 may be coupled to the previously unused contingent flanges, such as contingent flange 164*c*, 164*g* on the mounting members 102*c*, 102*g*. In such manner, the enclosed area 101 is reduced and the expansion area 103 is enlarged.

Returning to FIG. 3, the mounting member 302*a* may include a top plate 312 at a distal end of the vertical member 310. The top plate 312 may be used to couple the mounting member 302*a* to the support member 304. The support member 304 may be a steel support beam spanning a distance between the mounting members 302*a*, 302*b*. While no fasteners are shown between the top plate 312 and support member 304, it should be understood that one or more forms of fasteners may be used to couple support member 304 to the top plate 312. Exemplary fasteners may include, for example, screws, bolts, nuts, washers, rivets, nails, anchors, staples, pins, clips, clamps, wedges, hooks, threaded inserts, toggle bolts, eye bolts, U-bolts, expansion bolts, T-nuts, and studs. The top plate 312 and the support member 304 may have corresponding holes/apertures that may be used in conjunction with a fastener to securely fasten the support member 304 to the top plate 312. Likewise, all or some of the mounting members 302*a*, 302*b* may include a top plate 312 to which to couple to the support member 304 (or other corresponding support member). The system may include multiple support members 304 along a wall (e.g., the south wall 154 of FIG. 1) or a single support member 304 along a wall (e.g., the south wall 154). In an exemplary embodiment, a single support member 304 spans horizontally between each adjacent mounting member. For example, returning to FIG. 1, a single support member may be placed between the mounting member 102*a* and the mounting member 102*b*, between the mounting member 102*b* and the mounting member 102*c*, and between the mounting member 102*c* and the mounting member 102*d*. Likewise, a single support member may span between the mounting members 102*d* and the mounting members 102*g*.

Returning to FIG. 3, the mounting member 302*a* may include a base plate 314. The base plate 314 may be coupled to the proximal end of the vertical member 310 through one or more fasteners (as described herein), welding, or be integrated into the vertical member 310 (e.g., the base plate 314 and the vertical member 310 are a single unitary element, such as manufactured during a forging or casting process). The top plate 312 may be similarly coupled to the vertical member 310 at the distal end of the vertical member 310.

Similar to the top plate 312, the base plate 314 may include various mounting apertures used to couple to footing mount 318. The footing mount 318, in some embodiments, is a steel embed plate. The footing mount (e.g., the steel embed plate) may provide a secure connection between a structural member, such as the base plate 314, and a footing 332*a*. The footing mount 318 may be made of high-strength steel and designed to be embedded within the concrete of the footing 332*a* during the pouring process. The embed plate may include a flat or contoured base with pre-drilled holes or slots to accommodate anchor bolts or other fastening methods. These anchor bolts may be used to secure the base plate 314 at a proximal end of the vertical member 310 to the footing mount 318, creating a stable connection that can withstand loads and forces imposed on the enclosure.

The footings 332*a*, 332*b* may be positioned a predefined distance from adjacent footings so as to allow the mounted adjacent mounting members (e.g., the mounting member 302*a*, 302*b*) to be distanced from each other as described in FIG. 1.

The modular enclosure panel 308, in certain implementations, may not be coupled to the at least one support member 304. In some embodiments, a waterproof or water-resistant gasket may be placed between the modular enclosure panel 308 and the at least one support member 304. Likewise, a waterproof or water-resistant gasket or gasket-like material may be placed between flanges 306*a*, 306*b*, 306*c* and the modular enclosure panel 308. Additionally or alternatively, the gasket may extend between the vertical member 310 and the modular enclosure panel 308. The protective covering may be coupled to the at least one support member 304. In such a manner, the modular enclosure panel 308 may be removed without removing the protective covering. In at least one embodiment, the modular enclosure panel 308 may be hingedly coupled to the mounting member 302*a* such that removal and/or repositioning of the modular enclosure panel 308 from the mounting member 302*b* allows for the modular enclosure panel 308 to hingedly rotate about the vertical member 310, allowing for ingress and egress of a generator.

The protective covering may be comprised of one or more modular sections, in similar fashion to the modular enclosure panels described herein. For example, a modular protective covering may span from the area defined by the corner points at the mounting members 102*a*, 102*b*, 102*e*, 102*f* of FIG. 1. Returning to FIG. 1 for illustrative purposes, the modular protective covering may be coupled to (1) a support member spanning between the mounting members 102*a* and the mounting members 102*b*, (2) a support member spanning between mounting members 102*e* and the mounting members 102*f*, and (3) to a support member spanning between the mounting members 102*a* and the mounting members 102*e*. Additional modular protective coverings may cover the remaining enclosed area in similar fashion. In other embodiments, a single protective covering covers the enclosed area 101.

Returning to FIG. 3, the modular enclosure panel 308 may be manufactured from a cementitious slab (e.g., with or without fibers or reinforcing materials), a fiberglass panel, a sheet metal panel, a wood panel, a building material, and/or a fibrous panel. Likewise, the modular enclosure panel 308 may include acoustically dampening materials coupled to it. The acoustically dampening materials may be designed to reduce or absorb sound energy transmitted and/or generated from the generators within the enclosed area, thus minimizing the transmission of noise and reverberation within the enclosed area and the surrounding environments. The acoustically dampening materials may have properties that allow them to absorb sound waves rather than reflecting them, thereby reducing the intensity of sound and improving the acoustic environment. The acoustically dampening materials that may be coupled (or integrated into) the modular enclosure panel 308 may include acoustic foam panels, mineral wool insulation, fiberglass insulation, acoustic fabric panels, acoustic ceiling tiles, and soundproofing curtains.

The acoustically dampening materials may be integrated into the modular enclosure panel 308 (e.g., the modular enclosure panel 308 may be constructed of acoustically dampening materials), or may be coupled thereto by one or more fasteners or adhesives. Additionally or alternatively, the acoustically dampening materials may be coupled to the protective covering. The acoustically dampening material may be affixed to an exterior of the modular enclosure panel 308 (e.g., a surface opposite of that shown in FIG. 3) or an interior of the modular enclosure panel 308.

Turning now to FIG. 4A, a front-view (e.g., an interior view) of an enclosure panel 408 is shown. In an exemplary embodiment, the enclosure panel 408 may, in at least one implementation, be a pre-fabricated cementitious (e.g., concrete) panel. The enclosure panel 408 may be substantially similar to the modular enclosure panel 108*a* of FIG. 1. The enclosure panel 408 may include a lower portion 438, a first side 412, a second side 414, and a top portion 418. Along the top portion is positioned a lifting coupler 410. While a single lifting coupler 410 is described herein, it should be understood that the enclosure panel 408 may include multiple lifting couplers 410. The lifting coupler 410 may be affixed to the enclosure panel 408 along a top surface 422 of the enclosure panel 408. The lifting coupler 410 is configured to engage with a lifting mechanism (e.g., a crane, a winch, a boom, a pully) through a lift eye 424. While the lift eye 424 is shown as an aperture extending fully through the lifting coupler 410 from a first surface to a second surface, it should be understood that the lift eye 424 may extend, in some embodiments, only a portion of the way through the lifting coupler 410. Likewise, the lift eye 424, in some embodiments, may not define a complete aperture though the lifting coupler 410. For example, the lifting coupler 410 may be a hook, a carabiner, or other lifting coupler. In some embodiments, the lifting coupler 410 is fully integrated into the enclosure panel 408. By way of example, the lift eye 424 may be located within the enclosure panel 408 and not be located, or integrated, in the lifting coupler 410.

In some embodiments, the enclosure panel 408 may include multiple lifting couplers 410. In an exemplary embodiment, two lifting couplers 410 are positioned such that a center of gravity of the enclosure panel 408 is located between the two lifting couplers 410. In such embodiments, the first lifting coupler 410 may be positioned on the first side 412 and the second lifting coupler 410 may be positioned on the second side 414. While an exemplary configuration is illustrated in FIGS. 4A-4C with the lifting coupler 410 affixed to the top surface 422 of the enclosure panel 408, it should be understood that the lifting coupler 410 may be affixed to any part or portion of the enclosure panel 408. By way of example, the lifting coupler 410 may be coupled to one or more of a back surface 426 of the enclosure panel 408, a top surface 422, a first surface 434, a second surface 436, or a front surface 428. Likewise, the lifting coupler 410 may be coupled to any vertex or edge of the enclosure panel 408.

The enclosure panel 408 may also include a fuel access 430. The fuel access 430 may be an opening, aperture, hole, channel, etc. through which access may be made from the back surface 426 (e.g., the external side) to the front surface 428 (e.g., the internal/enclosed side), and vice versa. The fuel access 430 may be any suitable shape or size. In an exemplary embodiment, the fuel access 430 is used to provide a fuel conduit (e.g., a diesel hose) access to the interior of an area enclosed with one or more enclosure panels, such as enclosure panel 408. The fuel access 430 may, in some embodiments, define a rectangular perimeter. The fuel access 430 may define an interior surface of the enclosure panel 408 through which a hose can pass. In some embodiments, the fuel access 430 is an opening in the enclosure panel 408. In some embodiments, the fuel access 430 has an interlocking device to which to couple to the fuel conduit. In some embodiments, the fuel access 430 is a valve or multi-port valve, as described in FIG. 2. The fuel access 430 may be positioned at the lower portion 438 of the enclosure panel 408 to facilitate access to the fuel conduit. However, it should be noted that the fuel access 430 may be positioned anywhere on the enclosure panel 408.

The enclosure panel 408 may include an access cover 432. The access cover 432 may be positioned so as to at least partially block the fuel access 430, thus preventing any undesired access into or out of the enclosed area. The access cover 432 may be any one of a door, a flap, a port, and/or a slide. Regardless of the type, the access cover 432 may be coupled to the enclosure panel 408. For example, the access cover 432 may be hingedly, slidely, or compliantly coupled to the enclosure panel 408. The access cover 432 may be coupled to the front surface 428 (as illustrated in FIGS. 4A-4C), the back surface 426, and/or the inner surface of the fuel access 430.

While in an exemplary embodiment, the fuel access 430 and the access cover 432 are used to allow access of a fuel conduit, it should be understood that the fuel access 430 and the access cover 432 may be used for any access through the enclosure panel 408. By way of example, the fuel access 430 and the access cover 432 may define a door through which an operator may enter/exit the enclosed area.

FIG. 4B shows a side profile of the enclosure panel 408. The side view of FIG. 4B provides a view of a recessed surface 420 (also shown in FIG. 4A and FIG. 4C.). The recessed surface 420 is offset from the front surface 428 in some embodiments (as illustrated FIGS. 4A-5). However, in other embodiments, the recessed surface 420 is offset from the back surface 426. The recessed surface 420 may be offset from the front surface 428 so as to allow an interfacing mounting flange (e.g., the flange 306*a* of FIG. 3) to engage with the enclosure panel 408. The interfacing flange may engage (e.g., touch) a side 440 or a side 442 of the enclosure panel 408. The recessed surface 420 may extend a length of the second side 414. In other embodiments, as shown in FIGS. 4A-4C, the recessed surface 420 may extend a portion of the second side 414. In other embodiments, the enclosure panel 408 may include multiple recessed surfaces, such as recessed surface 420 along the second side 414. For example, the enclosure panel 408 may include three recessed surfaces, such as recessed surface 420 along the second side 414 to correspond with three flanges to which the enclosure panel 408 is mounted using one or more mounting apertures, such as mounting aperture 416. In some embodiments, the enclosure panel 408 does not have a recessed surface 420. In other embodiments, the recessed surface 420 is a channel within the enclosure panel 408 in which a corresponding flange slides into.

As described in FIG. 3, the mounting aperture 416 of the enclosure panel 408 may define an aperture in the enclosure panel 408, extending from the recessed surface 420 to the back surface 426. The mounting aperture 416 may define a second inner surface of the enclosure panel 408 through which one or more fasteners pass through to couple the enclosure panel 408 to a mounting member (e.g., the mounting member 302*a* of FIG. 3). The mounting aperture 416 may define a circular right cylinder aperture within the enclosure panel 408.

Turning now to FIG. 5, a front view of a modular enclosure panel 508 is illustrated. In an exemplary embodiment, the modular enclosure panel 508 may be a prefabricated sheet metal or fiberglass panel. The modular enclosure panel 508 may be substantially similar to the modular enclosure panel 108*d* of FIG. 1. Similar to the enclosure panel 408 of FIG. 4A, the modular enclosure panel 508 may include an aperture. In some embodiments, the aperture is an air intake opening 530. The air intake opening 530 may be positioned substantially in the middle of the modular enclosure panel 508 and extend from an interior surface to an exterior surface so as to allow air movement from a location exterior of the modular enclosure panel 508 to the interior of the modular enclosure panel 508 (or vice versa). The air intake opening 530 may be similar to the air intake opening 158 of FIG. 1. In some embodiments, the air intake opening 530 extends from a recessed side 520*a* to a recessed side 520*b*.

Extending horizontally or vertically across the air intake opening 530 (e.g., from a first interior surface 522*a* of the air intake opening 530 to a second interior surface 522*b* of the air intake opening 530) are one or more louvers, such as louver 502. The louver 502 may be designed to regulate the flow of air into and/or out of the enclosed area while providing protection against environmental elements such as rain, snow, and debris. Typically made of metal or plastic, the louver 502 may be an angled slat or blade spaced apart from adjacent louvers to allow airflow while preventing the entry of large objects or unwanted pests. The angled design of the louver 502 aids in directing incoming air downwards, minimizing the potential for rainwater infiltration. The louver 502 is strategically positioned at the air intake opening 530 to ensure a steady supply of fresh air for the generator system within the enclosed area, increasing efficient combustion and cooling of the equipment. Additionally or alternatively, the air intake opening 530 may be equipped with insect screens or bird guards spanning at least a portion of the air intake opening 530 to prevent the entry of insects, birds, and other wildlife into the enclosed area. As described in FIG. 1, a horizontal width of the modular enclosure panel 508 extending from a first edge 524*a* to a second edge 524*b* is greater than a width of a generator to be mounted or positioned within the enclosed area.

The louver 502 may couple to the modular enclosure panel 508 through any known or available means such as a mounting shaft 506 which may extend into a bracket affixed to the modular enclosure panel 508. Alternatively, the mounting shaft 506 may be fixedly coupled to the louver 502 and extend into the second interior surface 522*b* (as shown in FIG. 5). The mounting shaft 506 may be substantially any shape such as cylindrically shaped to allow for rotational movement of the louver 502 about a longitudinal axis 504. In such embodiments, the mounting shaft 506 may be pivotally coupled to the modular enclosure panel 508. The louver 502 may, in some embodiments, be manually adjustable to pivot about the longitudinal axis 504. Additionally or alternatively, the louver 502 may be electromechanically actuated to pivot about the longitudinal axis 504. By way of example, and as illustrated in FIG. 5, an actuator 510 may be coupled to the mounting shaft 506 and/or the louver 502. In some embodiments, the actuator 510 is a stepper motor, a servo motor, a piezoelectric motor, etc. The actuator 510 may be gearedly or otherwise physically coupled to the louver 502 and of the mounting shaft 506 so as to be able to rotate the louver 502 about the longitudinal axis 504 between various states (e.g., a closed state in which the louver 502 blocks all or some air flow through the air intake opening 530 and an open state in which the louver 502 is positioned to allow maximum air flow through the air intake opening 530). The actuator 510 may be communicatively coupled to the subsystem 512. The subsystem 512 may be a controller, including one or more processors and computer-readable and non-transitory memory with instructions stored thereon that when executed by the one or more processors cause the one or more processors to transmit one or more control signals to the actuator 510 to adjust a position. The subsystem 512 may be mounted to the modular enclosure panel 508 or, for example, along a non-removable wall of an enclosed area (e.g., the telemetry enclosure panel 104 of FIG. 1).

It should be understood that the modular enclosure panel 508 may be located at an air intake (e.g., location at which air is brought into the enclosed area) or an air output (e.g., location at which air is expelled from the enclosed area. For example, one or more louvers, such as louver 502, may be placed on the modular enclosure panel 108*d* of FIG. 1 and/or the modular enclosure panel 108*a* of FIG. 1. In at least one embodiment, louvers on an intake side of the enclosed area (e.g., the modular enclosure panel 108*d* of FIG. 1) may have actuated (e.g., electromechanical or manual) louvers while the louvers on the modular enclosure panel 108*a* may be statically coupled to the modular enclosure panel 108*a*. However, it is understood that any combination of actuated or static louvers may be employed between the intake and output. It should also be understood that louvers may be included in addition or alternative to a fuel access door (e.g., the fuel access 130 of the modular enclosure panel 108*a* of FIG. 1).

Figure 6:
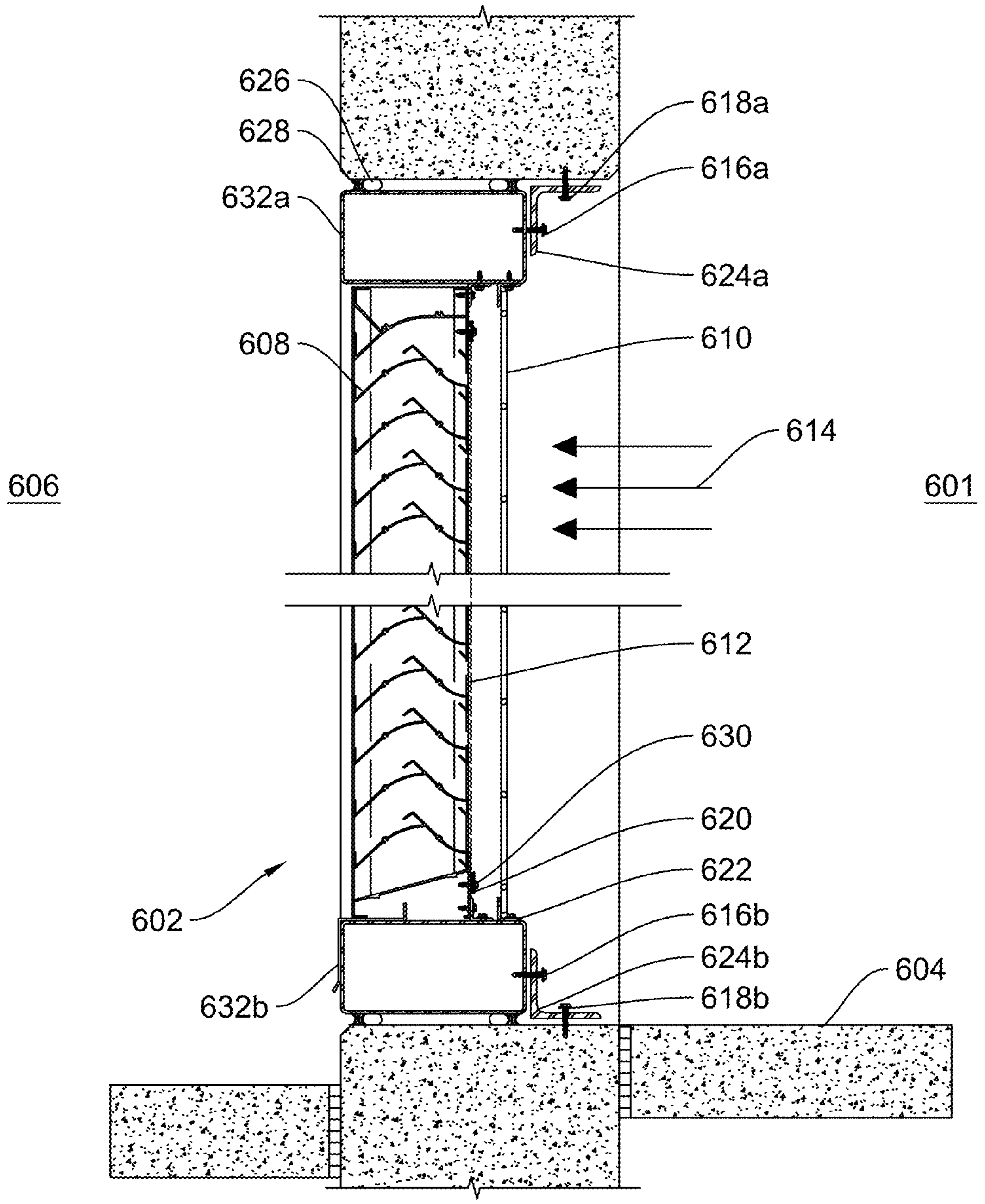
FIG. 6 is a cross-sectional side view of an enclosure panel including a louvered exhaust assembly, a security barrier, and an interior mounting structure, according to an embodiment.

Turning now to FIG. 6, a cross-sectional side view of an enclosure panel 602 and associated ventilation interface is shown, according to an embodiment. The system includes an enclosed area 601 defined in part by the enclosure panel 602 coupled between an upper support surface (e.g., a second support surface) and a support surface 604 (e.g., a first support surface). The enclosure panel 602 includes one or more louvers, shown as louver 608, through which exhaust air 614 (e.g., heated air from one or more generators) may be directed outward from the enclosed area 601 to an exterior 606. In some embodiments, the enclosure panel 602 includes a screen, shown as bird screen 612, and a set of security bars, such as security bars 610. The security bars 610 may be configured to span an opening of the enclosure panel 602 to prevent ingress or egress by unauthorized persons through the opening of the enclosure panel 602. The security bars 610 may be horizontally spaced across the opening and span between upper and lower mounting members (e.g., mounting member 632*a* and mounting member 632*b*). In some embodiments, the security bars 610 are spaced vertically and span horizontally across the opening of the enclosure panel 602. The security bars 610 may be fixed or adjustable and may be formed from metal or polymeric materials with corrosion-resistant properties suitable for prolonged exposure to thermal and environmental cycling. While it is contemplated that the security bars 610 are implanted as bars, it is understood that the security bars 610 may take the form of any security barrier, including, but not limited to, rails, pillars, mesh, columns, walls, etc.

In some embodiments, the enclosure panel 602 includes mounting member 632*a*, 632*b* that interfaces with the surrounding wall or support frame. The mounting member 632*a* and/or the mounting member 632*b* may form in part a structural frame of the enclosure panel 602 to which the louver 608 (or louver frame within which the enclosure panel 602 is positioned) is coupled. the mounting member 632*a* and/or the mounting member 632*b* may also be used to removably couple the enclosure panel 602 to a remainder of the structure (e.g., a generator building). The mounting member 632*b* may include embedded anchors, and may be cast or welded in place depending on the structural configuration of the enclosure system. The mounting member 632*b* may correspond to one or more of the mounting members previously described with respect to FIGS. 1-5, such as a vertical mounting member positioned between adjacent enclosure panels.

The mounting member 632*a* and/or the mounting member 632*b* may, in some embodiments, be an extruded metal channel or other structural component. The mounting member 632*b* is, in embodiments, coupled to a support surface 604 by an enclosure panel bracket 624*b*. The enclosure panel bracket 624*b* may be an angle iron or other bracket configured to couple the mounting member 632*b* to the support surface 604. The enclosure panel bracket 624*b* is coupled to the support surface 604 with a removable fastener 618*b*. The removable fasteners 618*b* may be a screw, bolt, adhesive, etc. The enclosure panel bracket 624*b* is coupled to the mounting member 632*b* by one or more fasteners, such as removable fastener 616*b*. The removable fastener 616*b* may be a screw, bolt, rivet, adhesive, etc.

The enclosure panel bracket 624*a* may be similarly configured to couple the mounting member 632*a* to the upper support surface (e.g., the ceiling/roof of the enclosed area 601). The enclosure panel bracket 624*a* may be secured to the upper support surface using one or more fasteners, including removable fastener 618*a*. The enclosure panel bracket 624*a* may additionally be secured to the mounting member 632*a* using a removable fastener 616*a*, which may pass through the enclosure panel bracket 624*a* and engage with an aperture in the mounting member 632*a*. In some embodiments, one or both of the enclosure panel brackets 624*a*, 624*b* may be integrally formed with the corresponding mounting member, such as mounting member 632*a*, 632*b*.

In some embodiments, a backer rod 626 is disposed in a joint formed between at least a portion of the enclosure panel 602 and an adjacent building element (a ceiling, the support surface 604, other enclosure panel, etc.). The backer rod 626 may be a closed-cell or open-cell foam, such as a polyethylene or polyurethane foam rod, configured to occupy the majority of the joint volume while providing a base for application of a sealant 628. The sealant 628 may be a moisture-resistant elastomeric material, such as silicone, polyurethane, or acrylic latex, and may be applied to form a watertight and/or airtight seal between the enclosure panel 602 and the adjacent surface. The backer rod 626 may prevent three-sided adhesion of the sealant 628, allowing for the sealant to flex and elongate in response to environmental or thermal changes, thus preserving the structural integrity and weatherproofing of the system.

A louver 608 may be supported by a louver bracket 620 positioned within the interior portion of the enclosure panel 602. The louver bracket 620 may be formed of metal and include a frame or track into which the louver 608 is seated. The louver bracket 620 may be directly or indirectly coupled to the mounting member 632*a* and/or mounting member 632*b* and may include a removable fastener 630 for installation and maintenance access. A security bar bracket 622 may similarly span the air input/air output opening and retain one or more security bars in position. In some embodiments, the security bar bracket 622 is configured to allow insertion and removal of individual security bars without full disassembly of the enclosure panel 602. Although the term louver is used herein, it should be understood that the louver 608 may be substituted for any suitable device, component, and/or features that facilitates the flow of air into, through, and/or out of the enclosure area. For example, the louver 608 may be implemented as a metal grate, mesh, or screen that allows air to pass in and out while preventing the ingress and/or egress of objects above a certain size.

In some embodiments, the louver 608 may include or be coupled to a bird screen 612, which may be a metallic mesh or perforated sheet disposed behind or in front of the louver blades to prevent ingress of birds or debris while permitting exhaust air 614. The bird screen 612 may be integrated with the louver bracket 620 or independently secured to the interior face of the louver 608 using mechanical fasteners, adhesives, or welding.

Alternative embodiments may not include one or more security bars, such as security bars 610, in non-secured environments or may substitute the security bars 610 and/or the louver 608 with a mesh screen, grille, or perforated panel. In further embodiments, the louver 608 may be an adjustable louver having pivotable blades controlled by a manual or electromechanical actuator. In such embodiments, the actuator may be mounted to a shaft or coupling member disposed through the louver bracket 620. Additionally, the mounting member 632*a* and/or mounting member 632*b* may include gaskets or thermal break components to enhance thermal isolation between the enclosure panel 602 and the structure of the enclosed area 601.

In some implementations, the enclosure panel may be implemented entirely as a louver (or louver assembly comprised of a plurality of louvers and a mounting frame) or screen member that serves both as a structural support member and/or facilitates the ingress and egress. By way of example, the louver assembly may be removably mounted to the enclosure such as to facilitate ingress and egress of one or more generators through an opening formed by the opening left by the removal of the louver assembly.

Figure 7:
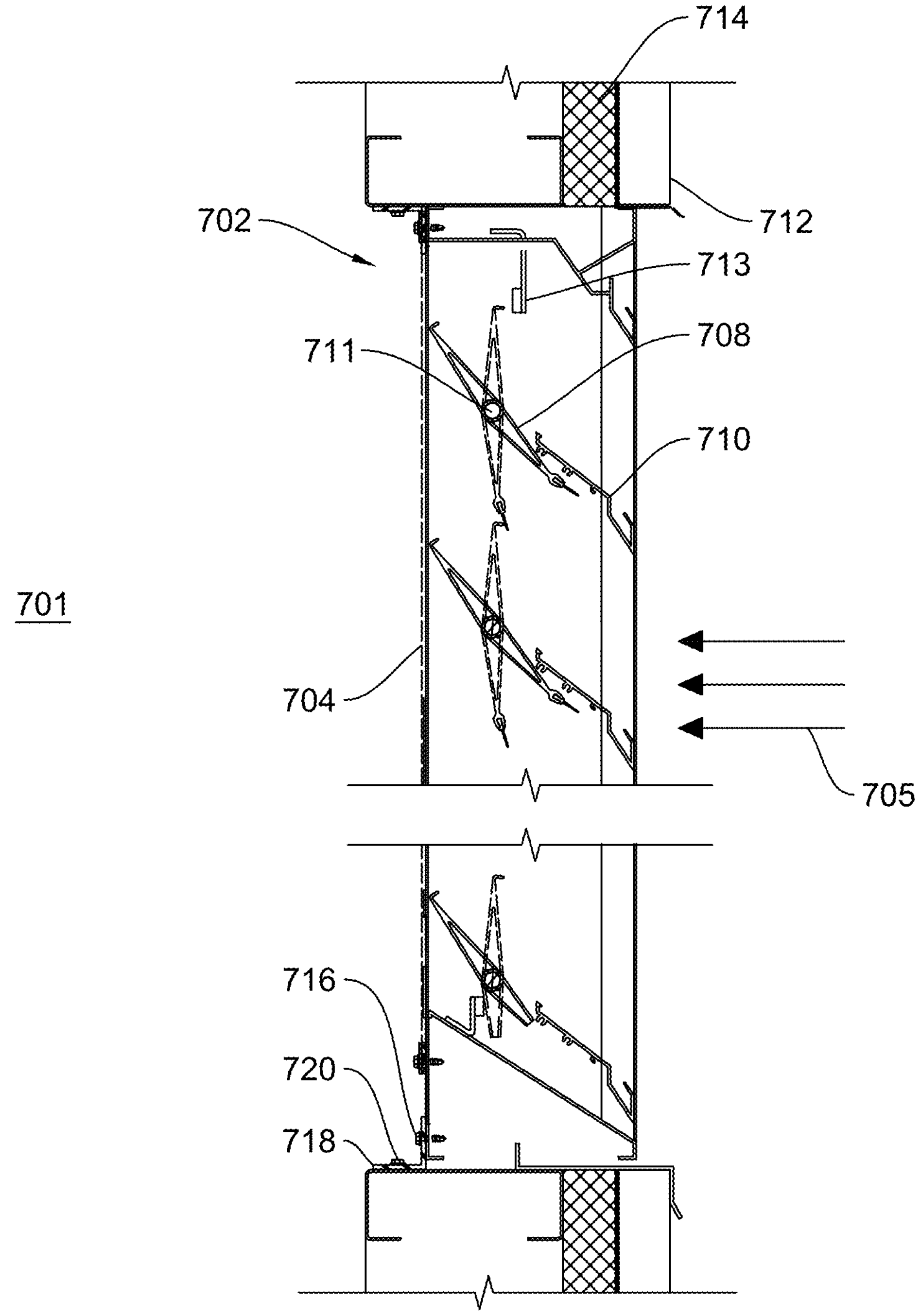
FIG. 7 is a cross-sectional side view of an enclosure panel including adjustable and stationary louvers, an insect screen, and removable fasteners for air intake regulation, according to an embodiment.

Turning now to FIG. 7, a cross-sectional side view of an alternative enclosure panel assembly is shown, illustrating an air intake interface, according to an embodiment. The system includes an enclosed area 701 defined in part by an enclosure panel 702. The enclosure panel 702 is configured to separate the enclosed area 701 from an interstitial area 706, such as an electrical yard between the enclosed area and a primary data center to which one or more generators within the enclosed area 701 supply electrical energy. The enclosure panel 702 extends between a lower support surface and an upper portion of a building structure and defines a vertical airflow path for intake air 705 entering the enclosed area 701.

The enclosure panel 702 includes an opening through which airflow may be admitted, the airflow being regulated by a set of louvers or openings. In the illustrated embodiment, the opening includes a set of adjustable louvers, shown as adjustable louver 708, and a set of stationary louvers, shown as stationary louver 710. The adjustable louver 708 may be pivotally mounted within the enclosure panel 702 and configured to vary angular position relative to incoming airflow between a closed position and an open position. Adjustment of the adjustable louvers 708 may be achieved using a pivot mechanism, shown as pivot 711, which mechanically couples the adjustable louvers 708 to a control linkage. The pivot 711 may be mounted through the adjustable louvers 708 and seated within a slot or bracket integrated into the enclosure panel 702. In some embodiments, a manual or electromechanical actuator may be used to rotate adjustable louvers 708 about the pivot 711, thereby changing the orientation of the adjustable louvers 708 and modulating the flow of intake air 705 into the enclosed area 701.

Below the adjustable louver 708, the stationary louver 710 is fixed in place and extends across the cross-section of the enclosure panel 702. The stationary louver 710 may be angled to deflect water, debris, or other airborne particles while maintaining an open airflow path for intake air 705. In some embodiments, the stationary louver 710 may be installed in a non-parallel configuration to further disrupt airflow and promote mixing or filtering. The combination of the adjustable louver 708 and stationary louver 710 may be used to balance pressure differentials (as measured by a pressure sensor 713, shown as a pitot tube), maintain thermal equilibrium, and/or control humidity within the enclosed area 701.

Positioned along the interior face of the enclosure panel 702 is a wildlife or insect screen 704. The insect screen 704 may span the full height and width of the louvered opening and may be configured to prevent ingress of insects or fine particulates into the enclosed area 701. The insect screen 704 may be formed of metallic mesh, polymeric grid, or other breathable material and may be mounted in a tensioned frame seated within the enclosure panel 702. In some embodiments, the insect screen 704 is removably fastened to the enclosure panel 702 using mechanical fasteners, enabling cleaning or replacement during maintenance cycles.

Coupled along a lower portion of the enclosure panel 702 is one or more enclosure panel brackets, shown as enclosure panel bracket 718. The enclosure panel bracket 718 may be used to structurally anchor the panel to a lower support structure or footing, such as through a fastener 720. The enclosure panel bracket 718 may be an angle iron, formed steel plate, or other rigid coupling member. The enclosure panel bracket 718 may include one or more apertures for receiving fasteners used to secure the bracket to the enclosure panel 702 and/or to the adjacent structural surface or support surface.

To permit selective removal of the enclosure panel 702 (and thereby access to a generator location for installation, removal, or maintenance), one or more removable fasteners, such as removable fastener 716, are provided. The removable fasteners 716 may include bolts, screws, clips, or cam-lock mechanisms configured to engage with mating elements in the structural wall or building frame. The removable fasteners 716 allow the enclosure panel 702 to be withdrawn for service access to one or more energy conversion devices within the enclosed area 701 or for replacement with an alternative ventilation panel (e.g., for seasonal performance tuning or after operational wear). In some embodiments, removable fasteners 716 are positioned both at the top and bottom of the enclosure panel 702 to distribute load and maintain panel alignment.

The illustrated embodiment shows the enclosure panel 702 seated between a metal panel 714 and a lower support surface. The metal panel 714 may form part of the exterior face 712 of the building and may overlay or abut the enclosure panel 702. In some configurations, the metal panel 714 is fastened to a building superstructure and provides exterior weather protection. The interface between the enclosure panel 702 and the metal panel 714 may be sealed with a backer rod and sealant as described previously with respect to FIG. 6. The metal panel 714 may, in some embodiments, be an insulated metal panel configured to thermally isolate the enclosed area 701 from external temperature variations. The insulated metal panel may include an inner and outer metal skin separated by a core of insulating material, such as polyisocyanurate foam, expanded polystyrene, or mineral wool. The insulated panel may be fastened to the structural frame using concealed clips or exposed fasteners and may include integrated gaskets or sealants to enhance air and water resistance at the panel joints.

Figure 8:
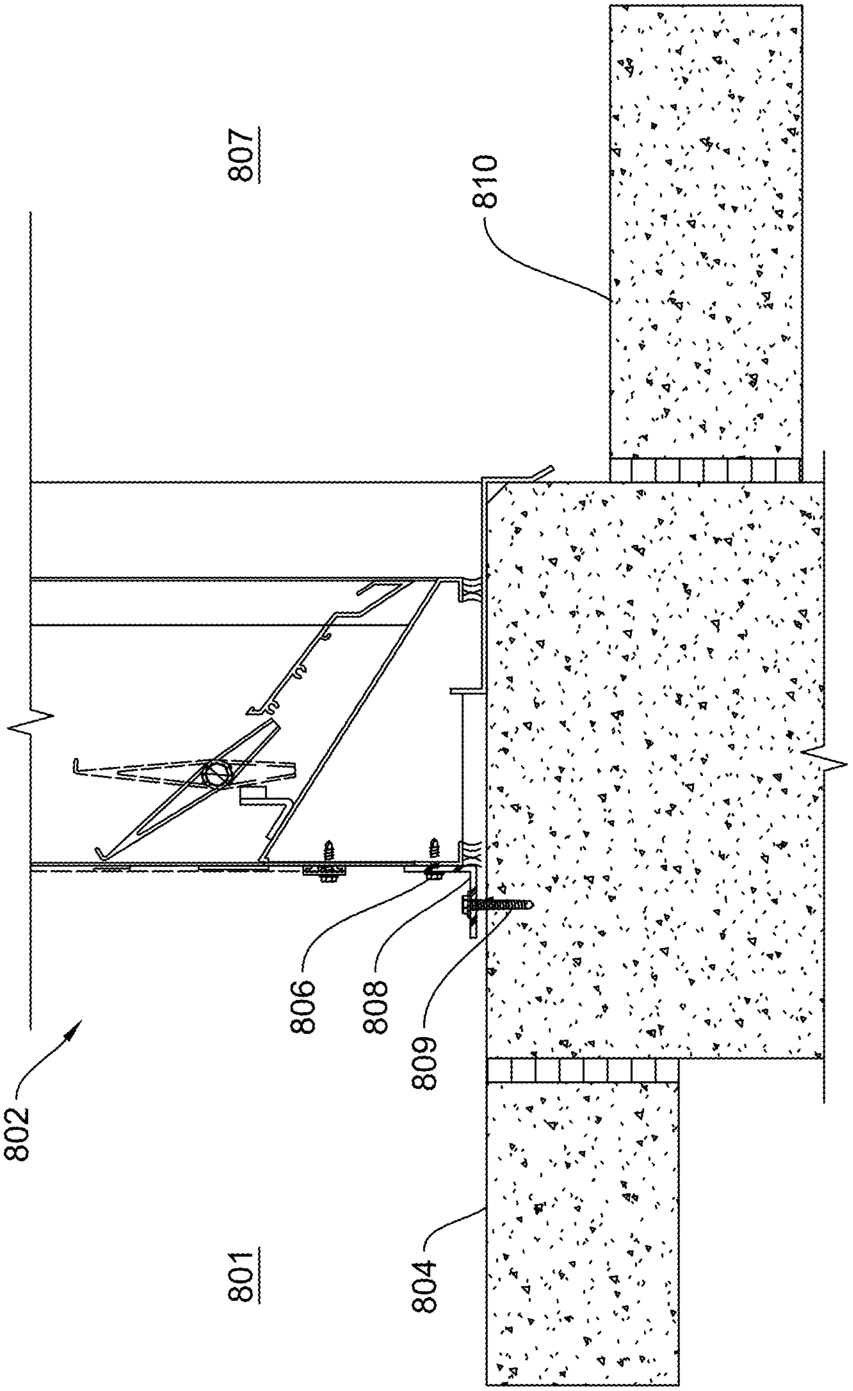
FIG. 8 is a cross-sectional side view of an enclosure panel installed between an enclosed area and an interstitial area, illustrating mounting hardware and support interface components, according to an embodiment.

Turning now to FIG. 8, a cross-sectional side view of another enclosure panel interface is shown, illustrating an intake air interface from an interstitial area to an enclosed area, according to an embodiment. The system includes an enclosed area 801, such as where a generator is located, separated from an interstitial area 807 (e.g., an electrical yard or auxiliary utility space) by an enclosure panel 802. The enclosure panel 802 is positioned between a structural wall or floor and a vertical exterior support surface. The enclosure panel 802 is configured to regulate or permit airflow from the interstitial area 807 into the enclosed area 801 through one or more louvered or screened openings defined by the enclosure panel 802. In this way, air is provided to one or more energy conversion devices within the enclosed area 801. Further, by intaking air from the interstitial area 807, the heated air from electrical equipment within the interstitial area 807 is removed from near the primary data center, which may be positioned on a side opposite the interstitial area 807 from the enclosed area 801.

The enclosure panel 802 is supported at a lower portion by a mounting assembly that includes one or more panel brackets, shown as enclosure panel bracket 808. The enclosure panel bracket 808 may be a rigid metal bracket, such as an angle iron or formed steel component, which interfaces between the enclosure panel 802 and a support footing (e.g., first support surface), wall edge, or embedded frame. The enclosure panel bracket 808 may be mechanically fastened to the enclosure panel 802 using one or more removable fasteners, such as removable fastener 806, and may be anchored to the adjacent surface (e.g., a first support surface 804, an exterior support surface 810, and/or concrete pad) using a fastener 809. In some embodiments, the enclosure panel bracket 808 may be fabricated with slotted holes to allow for thermal movement or alignment adjustment during installation.

The removable fastener 806 may pass through the enclosure panel bracket 808 into a structural member (e.g., a mounting member) of the enclosure panel 802 and may be configured to withstand tension and shear forces resulting from differential pressure across the enclosure panel 802. The fastener 809 may be embedded into the first support surface 804 and may be a bolt, expansion anchor, or chemical adhesive fastener capable of maintaining bracket alignment over long-term loading conditions.

To enable selective removal of the enclosure panel 802, the interstitial area 807 may be provided at a different interface location, such as through a vertical mounting flange or internal clip connection. The removable fastener 806 may allow the enclosure panel 802 to be detached for access into the enclosed area 801. In some embodiments, the removable fastener 806 may be concealed behind the outer cladding and accessible only from within the enclosed area 801.

To support the vertical structure surrounding the enclosure panel 802, the exterior support surface 810 may be formed as a concrete or steel-reinforced wall element. The exterior support surface 810 and/or the first support surface 804 may bear against the enclosure panel 802 and define a bounding surface through which a portion of the intake airflow is routed. A gasket, backer rod, or sealant may be applied at the interface between the enclosure panel 802 and the exterior support surface 810 and/or first support surface 804 to prevent water ingress, vibration transmission, or unwanted airflow leakage.

In alternative embodiments, the enclosure panel 802 may include additional elements such as an adjustable louver assembly, a backdraft damper, or an acoustic attenuator to manage intake airflow, noise control, and environmental exposure. In further embodiments, a sensor may be disposed within or proximate to the enclosure panel 802 to monitor differential pressure, humidity, or particulate concentration, and provide input to a control system for automated air intake regulation. As shown in FIG. 8, removal of the enclosure panel 802 may provide a flat surface without ledge or other barrier to ingress or egress of an energy conversion device, facilitating ingress and egress of the energy conversion device.

Figure 9:
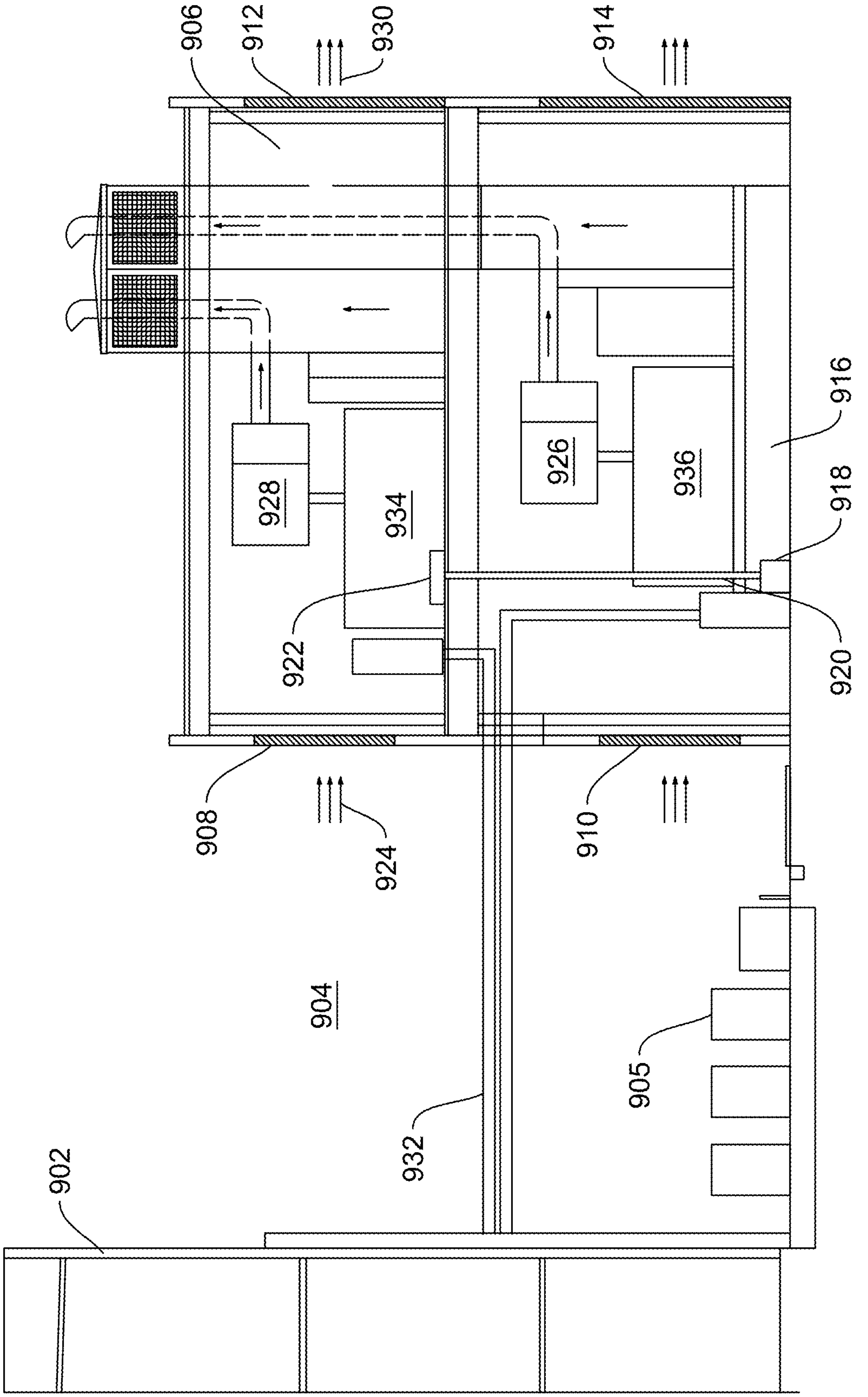
FIG. 9 is a cross-sectional side view of a modular enclosure system housing multiple energy conversion devices and illustrating intake and exhaust airflow paths across an interstitial area, according to an embodiment.

Turning now to FIG. 9, a cross-sectional side view of a modular enclosure system with a plurality of levels is shown, according to an embodiment. The illustrated embodiment includes one or more enclosed areas, shown as enclosed area 906, each housing one or more energy conversion devices configured to generate electrical energy and one or more auxiliary systems configured to support operation of the energy conversion devices. The modular enclosure system may be positioned proximate or substantially proximate to a primary data center 902 and an interstitial area 904, the interstitial area 904 being defined between the enclosed area 906 and the primary data center 902. As illustrated, the interstitial area 904 may include electrical conduit 932 or other infrastructure to support operation (e.g., electrical components 905) of the energy conversion system. For example, the electrical components 905 may include one or more transformers, relays, switches, capacitors, inductors, and/or electrical buses that are electrically coupled to an electrical system of the primary data center 902 and/or one or more electrical conversion devices within the enclosed area 906.

Positioned within the enclosed area 906 is a first energy conversion device 936. The first energy conversion device 936 may be an internal combustion engine generator, battery, gas turbine, fuel cell, or other engine configured to convert stored energy (e.g., chemical or thermal energy) into electrical energy. In the illustrated embodiment, the first energy conversion device 936 is supported by an auxiliary system including a pump 918 and a first fluid reservoir 916. The pump 918 is configured to deliver fuel from the first fluid reservoir 916 to the first energy conversion device 936 along a controlled pathway. The first energy conversion device 936 is fluidly coupled to a louver 914 so as to discharge exhaust air through the louver 914, thereby establishing a forced ventilation path from intake air through louver 910 to exhaust air 930 provided through louver 914.

Similarly, the enclosed area 906 includes a second energy conversion device 934 supported on a second support surface (e.g., on a second story). The second energy conversion device 934 may be structurally and functionally similar to the first energy conversion device 936, and is likewise configured to generate electrical energy for delivery to the primary data center 902 or another downstream load. Fuel for the second energy conversion device 934 is provided by a fuel conduit 920 by the pump 918. The fuel from the fuel conduit 920 is pumped to a second fluid reservoir 922 positioned proximate the second energy conversion device 934 and/or the second support surface. The fuel conduit 920 is configured to regulate the flow of fuel to the second energy conversion device 934, and may be controlled by a local or centralized control system. The second energy conversion device 934 receives intake air 924 from the interstitial area 904 through a louver 908 and expels exhaust air 930 through a louver 912, which may be similar in construction and function to other louvers as described herein.

In the illustrated embodiment, one or more of the louvers, shown as louver 908, 910, 912, 914, are configured to enable or restrict exhaust airflow based on operating conditions. The louvers may be fixed, adjustable, and/or automatically actuated in response to sensor inputs. In some embodiments, the louvers 912, 914 are integrated with dampers or backflow prevention mechanisms to maintain controlled pressure within the enclosed area 906. In some embodiments, the louvered exhaust assemblies are positioned proximate the top of the enclosure to promote thermal stratification and passive heat removal.

The interstitial area 904 is supplied with intake air 924 through an adjustable louver 910. The adjustable louver 910 may include one or more pivotable blades controlled by a manual or automated actuator. The adjustable louver 910 regulates the quantity and direction of intake air 924 flowing into the interstitial area 904, thereby enabling thermal conditioning or oxygen supply to the enclosed area 906. The adjustable louver 910 may be housed in an enclosure panel or wall structure separating the interstitial area 904 from ambient external conditions. In some embodiments, the adjustable louver 910 may include a filter, screen, or insulation element to improve air quality or reduce noise intrusion.

Positioned within the interstitial area 904 is one or more electrical components, shown as electrical components 905. The electrical components 905 may include transformers, switchgear, load banks, inverters, capacitors, inductors, and/or or control circuitry. The interstitial area 904 may also serve as an accessible service corridor for routing electrical conduit 932 between the energy conversion devices and the primary data center 902. In some embodiments, the electrical components 905 are mounted on elevated supports or insulated pedestals to facilitate maintenance access and to protect against thermal cycling or vibration.

The electrical components 905 located within the interstitial area 904 may generate heat. This generated heat results in a heat gradient within the interstitial area 904, leading in some embodiments to a localized heated zone in the interstitial area 904 between the enclosed area 906 and the primary data center 902. The system shown in FIG. 9 may be configured to facilitate the removal of the localized heat in the interstitial area 904. For example, the intake air 924 may be heated air from within the interstitial area 904, which is used for combustion and/or cooling of one or generators, such as the first energy conversion device 936 and/or the second energy conversion device 934, after which it is expelled as exhaust air 930 away from the primary data center 902. This flow of air from the interstitial area 904 to an exhaust side of the enclosed area 906 away from the primary data center 902 leads to improved temperature conditioning of the primary data center 902. Referring briefly to FIG. 1, the system 100 may be configured to direct airflow from the north wall 156 (e.g., a wall proximate to an interstitial area such as the interstitial area 904 of FIG. 9) to the south wall 154 (e.g., a wall leading away from an electrically coupled building such as a data center) to remove air (heated or otherwise) from a primary building electrically coupled to the one or more energy conversion devices.

The primary data center 902 may be a building, containerized computing structure, or a permanent installation, and may include server racks, cooling infrastructure, and data communication interfaces. The first energy conversion device 936 and the second energy conversion device 934 may be electrically coupled to the primary data center 902 via one or more electrical conduits, such as electrical conduit 932 or a switchboard, allowing generated electrical energy to be delivered in real-time or routed to one or more electrical storage systems.

The illustrated embodiment demonstrates a modular enclosure system wherein each of the enclosed area 906 includes an energy conversion device (e.g., first energy conversion device 936 or the second energy conversion device 934), a ventilation system including an exhaust louver (e.g., louver 912 or 914), and a fuel delivery system including a fuel conduit pump (e.g., the fuel conduit pump 918) and a fuel reservoir (e.g., a first fluid reservoir 916 or second fluid reservoir 922). The modular enclosure system further includes an interstitial area 904 between the primary data center 902 and the enclosed areas 906 configured to receive intake air 924 and route the intake air to at least one of the enclosed areas via one or more intake louvers, such as adjustable louver 910. The interstitial area 904 also includes at least one electrical conduit, shown as electrical conduit 932, electrically coupling the energy conversion device (e.g., the first energy conversion device 936 and/or the second energy conversion device 934) to a downstream load (e.g., primary data center 902). In some embodiments, the enclosed area 906 is thermally and acoustically isolated from the interstitial area 904 and may be accessed independently for service or replacement.

The system shown in FIG. 9 facilitates the flow of air (e.g., the intake air 924 from the interstitial area 904, through the louver 908, through the enclosed area 906, and out the louver 912. Likewise, in some embodiments, the system may facilitate the flow of air from the interstitial area 904, through the louver 910, through the enclosed area 906, and out the louver 914. In this manner, the system provides a future-expandable system for removing heated air from the interstitial area 904, cooling the second energy conversion device 934 and/or the first energy conversion device 936, and exhausting the air away from the interstitial area 904.

Positioned in the enclosed area and coupled to the first energy conversion device 936 or the second energy conversion device 934 are diesel particulate filters (DPFs), shown as DPF 926 and DPF 928, respectively. One or more of the diesel particulate filters is configured to receive exhaust gases generated by the corresponding energy conversion device and remove particulate matter from the exhaust stream prior to discharge through the corresponding louver (e.g., louver 912 or louver 914). The DPF 926 is fluidly coupled between the exhaust outlet of the first energy conversion device 936 and exhausts through the roof outlet or muffler, while DPF 928 is fluidly coupled between the second energy conversion device 928 and exhausts through the roof outlet or muffler. In some embodiments, one or more of DPF 926, 928 may include a ceramic honeycomb structure coated with a catalyst material to oxidize or trap carbon-based particulates. The DPFs may be equipped with pressure sensors, temperature sensors, and regeneration heaters to monitor and control soot accumulation. In certain implementations, DPF 926 and DPF 928 are integrated within a modular exhaust assembly positioned above or beside the energy conversion devices and may, in certain embodiments, be accessed from the interstitial area 904 for inspection, cleaning, or replacement. The inclusion of DPF 926 and DPF 928 enhances compliance with emissions standards and improves overall air quality by filtering harmful particulates from the exhaust air 930 discharged from the modular enclosure system.

Alternative embodiments may include additional enclosed areas, redundant fuel delivery systems, or separate HVAC plenums. In further embodiments, intake air 924 may be conditioned, filtered, or redirected based on temperature, humidity, or air quality parameters monitored within the interstitial area 904 or enclosed area 906. Additionally, one or more exhaust stacks or mufflers may be coupled to the louvers 912, 914 to attenuate sound or direct emissions vertically. The electrical conduit 932 may include shielded cable trays or bus duct assemblies to support high-voltage or high-frequency loads. In some configurations, the interstitial area 904 may further include lighting, fire suppression equipment, or structural access pathways.

Figure 10:
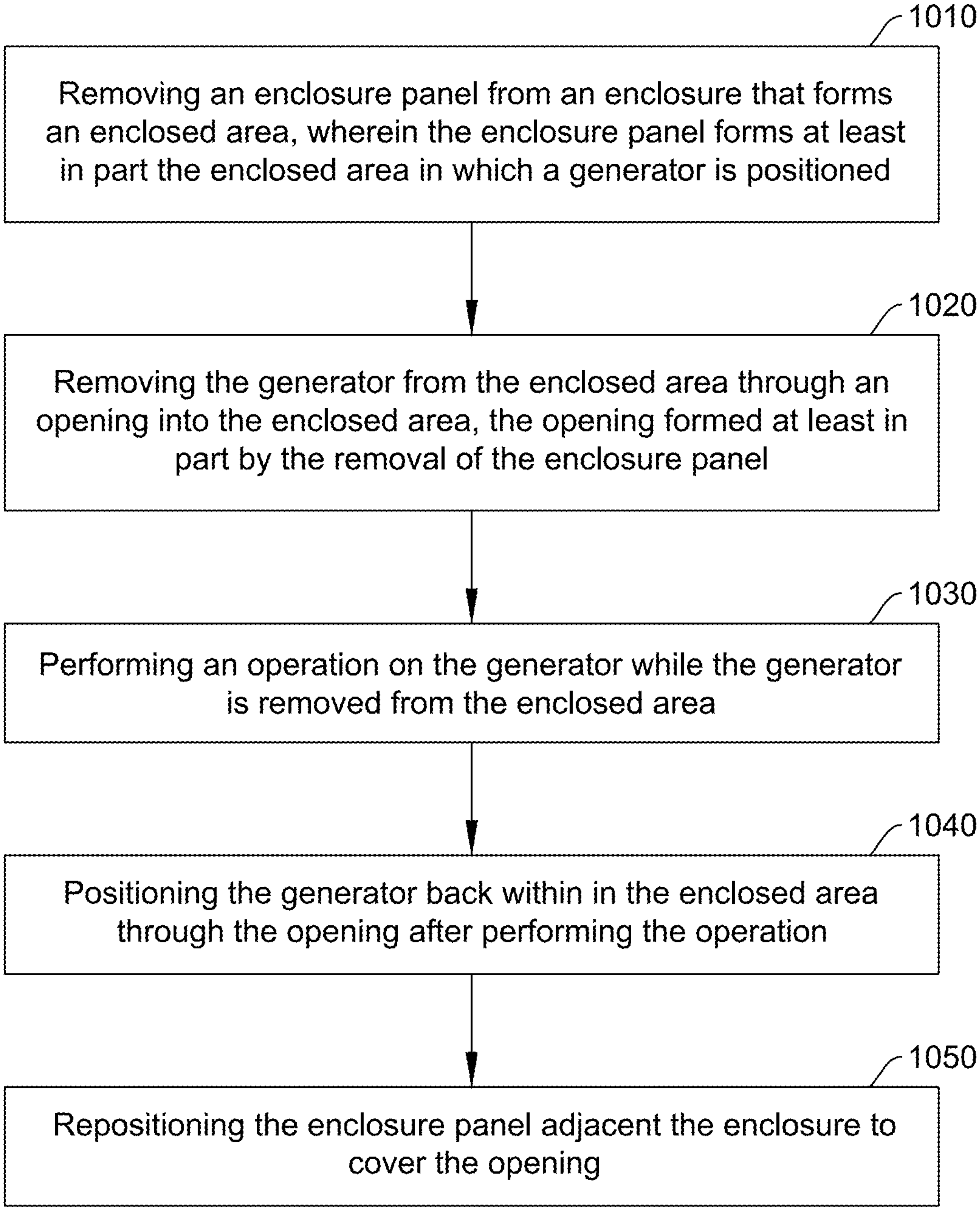
FIG. 10 is a flow chart of a method for removing, operating on, and replacing an electrical energy conversion device, according to an embodiment.

Turning now to FIG. 10, a flowchart is shown illustrating an example method for removing, operating, and replacing a generator through one or more enclosure panels, according to an embodiment. It should be appreciated that although the method steps described herein are presented in a particular order or grouping for purposes of clarity and explanation, the steps may be performed in a different order or in parallel, and that some steps may be omitted, repeated, or combined without departing from the scope of the disclosed embodiments. Moreover, while certain steps are described as being performed by particular systems, components, or operators, any of the steps may be implemented manually, mechanically, automatically, or in coordination with a control system. The described method may be implemented as a standard service protocol for modular energy systems or used in ad hoc scenarios, such as emergency generator replacement or system retrofitting.

At step 1010, the method includes removing, either partially or fully, an enclosure panel that forms an enclosed area, wherein the enclosure panel forms at least in part the enclosed area in which a generator is positioned. The enclosure panel may be fully or partially removably secured to a modular structural frame, such as a frame defined by a pair of vertical mounting members and a support surface. The enclosure panel may be mounted using one or more removable fasteners, such as bolts, screws, rivets, clamps, or cam-lock mechanisms, and may include integrated lifting couplers or grab points to interface with a lifting apparatus. In some embodiments, the enclosure panel may incorporate a sealing interface, such as a backer rod and sealant or gasket, disposed along the perimeter of the panel. Removal of the enclosure panel may involve hinging or disengaging one or more removable fasteners, separating the panel from the mounting members, and lifting or laterally translating the panel to create an opening into the enclosed area. In certain embodiments, the enclosure panel may be fabricated from an acoustically rated or thermally insulating material and may include one or more cutouts for ventilation, fuel access, or telemetry, which may also be temporarily removed or disconnected during the removal operation.

At step 1020, the method includes removing the generator from the enclosed area through an opening into the enclosed area, the opening formed at least in part by the removal of the enclosure panel. The generator may be an energy conversion device, such as a diesel or natural gas generator, positioned on a structural foundation, skid, or support frame within the enclosed area. Removal of the generator may be facilitated by an overhead crane, forklift, winch, gantry system, or wheeled dolly that engages with lifting points or mounting hardware on the generator housing. In some embodiments, the generator is initially decoupled from one or more interface systems prior to removal, including a fuel conduit, electrical connections, exhaust ducting, and telemetry systems. The disconnection process may include isolating fuel valves, disconnecting high-voltage or low-voltage wiring from an electrical conduit or switchgear, and unfastening exhaust hardware coupled to a louver or muffler assembly.

Once disconnected, the generator may be lifted vertically or pulled horizontally through the opening created by the removed or opened enclosure panel. The clearance between vertical mounting members may be predetermined to match or exceed the width of the generator, plus a safety or service margin. In configurations where the mounting members are spaced to provide nominal clearance, alignment guides or temporary floor plates may be installed to ensure that the generator can pass smoothly through the opening without interference. In further embodiments, integrated alignment indicators or registration features on the generator base or floor surface may assist in guiding the generator along the extraction path. The removed generator may then be positioned within a service bay, maintenance trailer, or staging area adjacent the enclosure for subsequent operation, inspection, or replacement.

At step 1030, the method includes performing an operation on the generator while the generator is removed from the enclosed area. The operation may include, but is not limited to, preventive maintenance, corrective maintenance, diagnostic evaluation, software update, component replacement, or full system overhaul. In some embodiments, the operation is performed at an offsite facility or adjacent maintenance area outfitted with tooling, testing equipment, and support infrastructure. The generator may be inspected for mechanical wear, fluid leaks, or electrical degradation, and components such as filters, belts, injectors, control units, or cooling systems may be cleaned, repaired, or replaced. In other embodiments, the generator may be coupled to a load bank and operated under controlled conditions to verify power output, response to load changes, and thermal stability. In certain scenarios, the generator may be replaced altogether with a new or refurbished unit.

The operation may also involve firmware or control logic updates to the generator's electronic control module (ECM) or supervisory systems, especially when the generator is configured for remote monitoring or autonomous operation. Telemetry sensors, control harnesses, and interface modules may be tested and recalibrated. In the case of engine-driven generators, emissions compliance systems—such as diesel particulate filters (DPFs) or selective catalytic reduction (SCR) modules—may also be cleaned, replaced, or regenerated during this step. The operation may be performed by a technician, automated system, or a combination of both, and may be recorded or logged into a maintenance database associated with the modular energy enclosure system. After completing the desired operations, the generator may be certified for reinstallation and redeployment within the enclosed area.

At step 1040, the method includes positioning the generator in the enclosed area through the opening. The generator may be the same unit removed in step 1020 following completion of the operation in step 1030, or it may be a replacement unit of substantially similar dimensions and functional characteristics. Positioning the generator may involve reversing the extraction procedure, wherein the generator is guided along a horizontal or vertical path into the enclosed area using a lifting device, roller track, dolly, or guided skid assembly. The opening into the enclosed area, defined at least in part by the removal (either fully or partial) of the enclosure panel, is dimensioned based on a minimum clearance threshold to accommodate the width, height, and mounting footprint of the generator with sufficient tolerance for guided reentry.

Once inside the enclosed area, the generator may be aligned with a structural base, such as a poured concrete pad, vibration isolation mount, or fabricated steel frame. In some embodiments, the support surface includes alignment pins, keying features, or edge brackets to ensure proper positioning of the generator for reconnection. The generator may be mechanically fastened to the support surface using anchor bolts, slide rails, or mounting clips, and reconnected to previously decoupled systems, including fuel conduit, electrical outputs, and exhaust ductwork. Fuel lines may be reattached via quick-disconnect couplings or threaded fittings; electrical conduit may be re-terminated at a bus or junction box; and exhaust hardware may be realigned with a louver or backpressure regulation device.

In some embodiments, telemetry connections or control wiring are re-established during this step, enabling the generator to be monitored and controlled from a central location. Environmental seals, such as gaskets or insulating boots, may be applied to one or more reconnection point to preserve thermal, acoustic, and moisture integrity of the enclosed area. The positioning step may further include verifying clearances from adjacent panels, confirming alignment with airflow paths, and completing mechanical torque checks or installation verification procedures prior to restoration of the enclosure panel in step 1050.

At step 1050, the method includes repositioning the enclosure panel adjacent the enclosure to cover the opening. The enclosure panel may be the same panel removed in step 1010 or a replacement panel of identical construction, size, and mounting configuration. The enclosure panel, in certain implementations, is repositioned using a lifting mechanism, such as a forklift, hoist, or mechanical arm, that engages with lifting couplers or integral grab points defined on the panel surface. In some embodiments, the enclosure panel includes a recessed mounting surface or edge flange configured to nest within or overlap the vertical mounting members or adjacent wall structure. The enclosure panel may be aligned using visual indicators, guide brackets, or mechanical locating features incorporated into the enclosure frame. In still other embodiments, the enclosure panel is hingedly attached and is moved back into position to cover the opening.

As the panel is lowered or translated into position, care is taken to seat the perimeter of the enclosure panel against the mounting interface to ensure continuous acoustic, thermal, and environmental sealing. In some embodiments, the interface between the enclosure panel and the surrounding enclosure structure includes a backer rod and sealant disposed in a joint gap, such that the panel compresses against the sealant to form a water-resistant and airtight barrier. Alternatively, the panel may include one or more gasket elements adhered to its rear face, which are compressed during final positioning to restore the enclosure's integrity.

This placement or repositioning step reestablishes the original enclosure geometry and prepares the system for reinstallation of fasteners and final sealing, if needed. In modular systems where the panel includes louvers, cable interfaces, or telemetry ports, additional connections or grommets may be resecured as the panel is placed. In some embodiments, temporary supports or holding fixtures may be used to maintain the panel's position prior to engagement of the removable fasteners.

The method may also include coupling the enclosure panel to the enclosure with one or more removable fasteners. The removable fasteners may include bolts, screws, threaded studs with nuts, rivets, or cam-lock mechanisms, and are configured to engage with pre-drilled or preformed mounting apertures in the enclosure panel and the corresponding mounting members or structural frame. In some embodiments, the fasteners pass through a recessed surface or flange of the enclosure panel and into tapped holes or brackets affixed to the vertical mounting members or mounting brackets, as described herein. Torque specifications may be applied during fastening to ensure consistent mechanical load and uniform compression of any sealing elements, such as gaskets, weather stripping, or elastomeric interfaces positioned along the perimeter of the panel.

The enclosure panel may be secured along multiple edges to distribute structural loads and maintain rigidity under wind, acoustic, or thermal cycling conditions. In certain configurations, fasteners are installed both along the top and bottom edges of the panel to resist uplift and displacement forces. Where the panel includes additional functional components—such as louvers, fuel access ports, or telemetry connectors—secondary fasteners or clips may also be installed to resecure these features if removed during step 1010. In some embodiments, removable fasteners may include visual indicators or locking mechanisms to verify that the fasteners are fully seated and secure.

Once the enclosure panel is secured in place, the enclosure is structurally and environmentally integrated to restore the enclosed area to its original operating condition. Final inspection or commissioning may then be performed to validate sealing, alignment, and functionality of the generator and associated systems housed within the enclosed area. This step concludes the panel removal and replacement cycle and enables the modular enclosure system to resume normal operation.

In some embodiments, the enclosed area includes a first story and a second story, such that the energy conversion device may be installed on a mezzanine, equipment platform, or elevated deck within the enclosure. In such embodiments, the enclosure panel may span both stories, and removal of the panel provides full-height access for vertical generator extraction. In some embodiments, the enclosure panel provides access to only one story or the other. In an additional embodiment, the enclosure panel includes a fuel access opening formed within a lower portion of the panel. This fuel access opening allows operators to deliver fuel to a fluid reservoir positioned within the enclosed area, such as a day tank or primary fuel tank, without removing the enclosure panel. A fuel conduit, hose, or automated fill device may be inserted through the fuel access opening, which may include a movable cover, gasket, or coupling port to maintain sealing integrity while permitting temporary access.

The systems and methods described herein may include one or more additional embodiments or implementations without departing from the scope herein. Such embodiments, may include, for example, a system, wherein the first enclosure panel includes at least one lifting coupler configured to couple to a lifting mechanism during removal of the first enclosure panel from the first mounting member and the second mounting member.

In some aspects, the techniques described herein relate to a system, wherein the first enclosure panel is made of a cementitious material.

In some aspects, the techniques described herein relate to a system, wherein the second enclosure panel is made of one of a fiberglass panel, a sheet metal panel, a wood panel, and a fibrous panel.

In some aspects, the techniques described herein relate to a system, wherein the third enclosure panel is a non-removable enclosure panel.

In some aspects, the techniques described herein relate to an apparatus for enclosing one or more generators, the apparatus including: a panel including: a recessed surface along at least a portion of a first side of the panel, wherein the recessed surface is offset from a front surface and corresponds to a shape of a mounting flange of a mounting member; a mounting aperture extending from the recessed surface of the panel to a second surface of the panel; and an aperture extending from a first surface of the panel to the second surface of the panel; and a lifting coupler.

In some aspects, the techniques described herein relate to an apparatus, wherein the mounting aperture is a circular right cylinder.

In some aspects, the techniques described herein relate to an apparatus, further including an access cover coupled to the panel and positioned to at least partially block the aperture.

In some aspects, the techniques described herein relate to an apparatus, wherein the access cover is one of a door, a flap, a port, and a slide.

In some aspects, the techniques described herein relate to an apparatus, wherein the lifting coupler is coupled to a top surface at a top portion of the panel.

In some aspects, the techniques described herein relate to an apparatus, wherein the lifting coupler is coupled to a back surface of the panel.

In some aspects, the techniques described herein relate to an apparatus, wherein the recessed surface extends from a bottom side of the panel to a top side of the panel.

In some aspects, the techniques described herein relate to an apparatus, wherein the aperture is a fuel access opening.

In some aspects, the techniques described herein relate to an apparatus, wherein the fuel access opening is configured to receive a fuel conduit.

In some aspects, the techniques described herein relate to an apparatus, wherein the fuel conduit is a hose.

In some aspects, the techniques described herein relate to an apparatus, wherein the aperture is an air intake opening.

In some aspects, the techniques described herein relate to an apparatus, further including a louver extending from a first inner surface of the air intake opening to a second inner surface of the air intake opening, wherein the first inner surface and the second inner surface define, in part, an outer perimeter of the aperture.

In some aspects, the techniques described herein relate to an apparatus, wherein the lifting coupler includes an inner surface defining a hole extending from a third surface of the lifting coupler to a fourth surface of the lifting coupler.

In some aspects, the techniques described herein relate to an apparatus, further including a movable access cover coupled to the panel and covering the fuel access opening in a first position and allowing access to the fuel access opening when in a second position.

In some aspects, the techniques described herein relate to an apparatus, wherein the louver is selectively positionable from a closed state to an open state.

In some aspects, the techniques described herein relate to an apparatus, wherein a horizontal width of the panel from a first edge to a second edge is greater than a width of a generator.

In some aspects, the techniques described herein relate to a system for enclosing a plurality of generators, the system including: a first plurality of mounting members vertically extending from a support surface, each of the first plurality of mounting members positioned substantially collinearly along the support surface, wherein each of the first plurality of mounting members are positioned a first distance from adjacent mounting members of the first plurality of mounting members; a second plurality of mounting members vertically extending from the support surface, each of the second plurality of mounting members positioned substantially collinearly along the support surface and substantially parallel to the first plurality of mounting members, wherein each of the second plurality of mounting members are positioned the first distance from adjacent mounting members of the second plurality of mounting members; a first enclosure panel extending vertically from the support surface and extending horizontally from a first mounting member of the first plurality of mounting members to a second mounting member of the first plurality of mounting members, the first enclosure panel non-removably coupled to the first mounting member and the second mounting member; wherein the first enclosure panel includes a selectable fuel distribution device positioned within a lower portion of the first enclosure panel; a second enclosure panel extending vertically from the support surface and extending horizontally from the second mounting member to a third mounting member of the first plurality of mounting members; a third enclosure panel extending vertically from the support surface and extending horizontally from a fourth mounting member of the second plurality of mounting members to a fifth mounting member of the second plurality of mounting members, the third enclosure panel non-removably coupled to the third mounting member and the fourth mounting member; a fourth enclosure panel extending vertically from the support surface and extending horizontally from the fifth mounting member to a sixth mounting member of the second plurality of mounting members, the fourth enclosure panel removably coupled to the fifth mounting member and the sixth mounting member, wherein the fourth enclosure panel is substantially parallel to the second enclosure panel; wherein the fourth enclosure panel includes an air intake opening with one or more louvers spanning the air intake opening; a fifth enclosure panel extending vertically from the support surface and extending horizontally from the first mounting member to the fourth mounting member, the fifth enclosure panel non-removably coupled to the first mounting member and the fourth mounting member; wherein the fifth enclosure panel includes one or more telemetry subsystems communicatively coupled to the plurality of generators; a sixth enclosure panel extending vertically from the support surface and extending horizontally from the third mounting member to the sixth mounting member, the sixth enclosure panel removably coupled to the third mounting member and the sixth mounting member; and a protective covering coupled to at least one of the first mounting member, the second mounting member, the third mounting member, the fourth mounting member, the fifth mounting member, and the sixth mounting member and configured to allow removal of at least one of the second enclosure panel, the fourth enclosure panel, and the fifth enclosure panel without removal of the protective covering.

In some aspects, the techniques described herein relate to a system, wherein the selectable fuel distribution device is a multi-port valve for selectably routing fluid to one or more generators within the system.

In some aspects, the techniques described herein relate to a system, further including a fluid conduit fluidly coupled at a first end of the fluid conduit to a first port of the selectable fuel distribution device and fluidly coupled at a second end of the fluid conduit to a fluid reservoir corresponding to a generator.

In some aspects, the techniques described herein relate to a system, further including a second fluid conduit fluidly coupled at a first end of the second fluid conduit to a second port of the selectable fuel distribution device and fluidly coupled at a second end of the second fluid conduit to a second fluid reservoir corresponding to a second generator.

In some aspects, the techniques described herein relate to a method including: removing an enclosure panel from an enclosure, wherein the enclosure panel forms at least in part an enclosed area in which a generator is positioned; removing the generator from the enclosed area through an opening into the enclosed area, the opening formed at least in part by the removal of the enclosure panel; performing an operation on the generator while the generator is removed from the enclosed area; positioning the generator back within the enclosed area through the opening after performing the operation on the generator; placing the enclosure panel adjacent the enclosure to cover the opening; coupling the enclosure panel to the enclosure with one or more removable fasteners.

In some aspects, the techniques described herein relate to a method, wherein the enclosed area includes a first story and a second story;

In some aspects, the techniques described herein relate to a method, wherein the generator is positioned on the second story of the enclosed area.

In some aspects, the techniques described herein relate to a method, wherein the enclosure panel spans across the first story and the second story.

In some aspects, the techniques described herein relate to a method, further including: providing fuel to a fluid reservoir through a fuel access opening within the enclosure panel.

In some aspects, the techniques described herein relate to a method, wherein the enclosure includes: a first plurality of mounting members extending in a direction generally vertical from a support surface, the first plurality of mounting members positioned substantially collinearly when viewed from a first direction along the support surface, wherein the first plurality of mounting members are positioned a first distance from adjacent mounting members of the first plurality of mounting members; a second plurality of mounting members extending in the direction generally vertical from the support surface, the second plurality of mounting members positioned substantially collinearly when viewed from a second direction along the support surface, wherein the second plurality of mounting members are positioned the first distance from adjacent mounting members of the second plurality of mounting members; a first enclosure panel extending at least partially between a first mounting member of the first plurality of mounting members and a second mounting member of the first plurality of mounting members, the first enclosure panel removably coupled to the first mounting member and the second mounting member, wherein the first enclosure panel includes a fuel access opening positioned within a lower portion of the first enclosure panel; a second enclosure panel extending at least partially between a third mounting member of the second plurality of mounting members and a fourth mounting member of the second plurality of mounting members, the second enclosure panel removably coupled to the first mounting member and the second mounting member, wherein the second enclosure panel includes an air intake opening with one or more louvers spanning at least partially the air intake opening; a third enclosure panel extending at least partially between the first mounting member and the third mounting member and including one or more telemetry subsystems communicatively coupled to the plurality of generators; and a protective covering coupled to at least one of the first mounting member, the second mounting member, the third mounting member, and the fourth mounting member, and configured to allow removal of at least one of the first enclosure panel and the second enclosure panel without removal of the protective covering.

While this specification contains many specific implementation details and/or arrangement details, these should not be construed as limitations on the scope of any inventions or of what may be claimed, but rather as descriptions of features specific to particular implementations and/or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, features described with respect to particular headings may be utilized with respect to and/or in combination with illustrative implementations described under other headings; headings, where provided, are included solely for the purpose of readability, and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations and/or arrangements described above should not be understood as requiring such separation in all implementations and/or arrangements, and it should be understood that the described program components and systems can generally be integrated together in a single software product or packaged into multiple software products.

Having now described some illustrative implementations, implementations, illustrative arrangements, and arrangements it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements, and features discussed only in connection with one implementation and/or arrangement are not intended to be excluded from a similar role in other implementations or arrangements.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations and/or arrangements consisting of the items listed thereafter exclusively. In one implementation, the systems and methods described herein consist of one, each combination of more than one, or all of the described elements, acts, or components.

Any references to implementations, arrangements, or elements or acts of the systems and methods herein referred to in the singular may also embrace implementations and/or arrangements including a plurality of these elements, and any references in plural to any implementation, arrangement, or element or act herein may also embrace implementations and/or arrangements including only a single element. References in the singular or plural form are not intended to limit the presently disclosed systems or methods, their components, acts, or elements to single or plural configurations. References to any act or element being based on any information, act or element may include implementations and/or arrangements where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

Any arrangement disclosed herein may be combined with any other arrangement, and references to "an arrangement," "some arrangements," "an alternate arrangement," "various arrangements," "one arrangement" or the like are not necessarily mutually exclusive and are intended to indicate that a particular feature, structure, or characteristic described in connection with the arrangement may be included in at least one arrangement. Such terms as used herein are not necessarily all referring to the same arrangement. Any arrangement may be combined with any other arrangement, inclusively or exclusively, in any manner consistent with the aspects and arrangements disclosed herein.

References to "or" may be construed as inclusive so that any terms described using "or" may indicate any of a single, more than one, and all of the described terms. For the purposes of the present disclosure, the term "a" or "an" entity refers to one or more of that entity. As such, the terms "a" or "an," "one or more" and "at least one" can be used interchangeably herein Where technical features in the drawings, detailed description or any claim are followed by reference signs, the reference signs have been included for the sole purpose of increasing the intelligibility of the drawings, detailed description, and claims. Accordingly, neither the reference signs nor their absence has any limiting effect on the scope of any claim elements.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or movable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

It is important to note that the construction and arrangement of the system and components thereof as shown in the various exemplary embodiments is illustrative only. Additionally, any element disclosed in one embodiment may be incorporated or utilized with any other embodiment disclosed herein.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

While this specification contains many specific implementation details and/or arrangement details, these should not be construed as limitations on the scope of any inventions or of what may be claimed, but rather as descriptions of features specific to particular implementations and/or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, features described with respect to particular headings may be utilized with respect to and/or in combination with illustrative arrangement described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations and/or arrangements described above should not be understood as requiring such separation in all implementations and/or arrangements, and it should be understood that the described program components and systems can generally be integrated together in a single software product or packaged into multiple software products.

Having now described some illustrative implementations, implementations, illustrative arrangements, and arrangements it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements and features discussed only in connection with one implementation and/or arrangement are not intended to be excluded from a similar role in other implementations or arrangements.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations and/or arrangements consisting of the items listed thereafter exclusively. In one arrangement, the systems and methods described herein consist of one, each combination of more than one, or all of the described elements, acts, or components.

Any references to implementations, arrangements, or elements or acts of the systems and methods herein referred to in the singular may also embrace implementations and/or arrangements including a plurality of these elements, and any references in plural to any implementation, arrangement, or element or act herein may also embrace implementations and/or arrangements including only a single element. References in the singular or plural form are not intended to limit the presently disclosed systems or methods, their components, acts, or elements to single or plural configurations. References to any act or element being based on any information, act or element may include implementations and/or arrangements where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

Any arrangement disclosed herein may be combined with any other arrangement, and references to "an arrangement," "some arrangements," "an alternate arrangement," "various arrangements," "one arrangement" or the like are not necessarily mutually exclusive and are intended to indicate that a particular feature, structure, or characteristic described in connection with the arrangement may be included in at least one arrangement. Such terms as used herein are not necessarily all referring to the same arrangement. Any arrangement may be combined with any other arrangement, inclusively or exclusively, in any manner consistent with the aspects and arrangements disclosed herein.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations and/or arrangements are illustrative rather than limiting of the described systems and methods. Scope of the systems and methods described herein is thus indicated by the appended claims, rather than the foregoing description, and changes that come within the meaning and range of equivalency of the claims are embraced therein.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring.

Any "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

The systems and methods described herein may be embodied in other specific forms without departing from the characteristics thereof. Although the examples provided herein relate to carbon dioxide gas and produced water from hydrocarbon production, the systems and methods described herein can include applied to other environments (e.g., wastewater, carbon tetroxide gas, etc.). The foregoing implementations and/or arrangements are illustrative rather than limiting of the described systems and methods. Scope of the systems and methods described herein is thus indicated by the appended claims, rather than the foregoing description, and changes that come within the meaning and range of equivalency of the claims are embraced therein.

It should be understood that no claim element herein is to be construed under the provisions of 35 U.S.C. § 112 (f) unless the element is expressly recited using the phrase "means for."

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure.

What is claimed is:

1. A system for enclosing a plurality of generators, the system comprising:

a first plurality of mounting members extending in a direction generally vertical from a support surface, the first plurality of mounting members positioned substantially collinearly when viewed from a first direction along the support surface, wherein the first plurality of mounting members are positioned a first distance from adjacent mounting members of the first plurality of mounting members;

a second plurality of mounting members extending in the direction generally vertical from the support surface, the second plurality of mounting members positioned substantially collinearly when viewed from a second direction along the support surface, wherein the second plurality of mounting members are positioned the first distance from adjacent mounting members of the second plurality of mounting members;

a first enclosure panel extending at least partially between a first mounting member of the first plurality of mounting members and a second mounting member of the first plurality of mounting members, the first enclosure panel removably coupled to the first mounting member and the second mounting member, wherein the first enclosure panel comprises a fuel access opening positioned within a lower portion of the first enclosure panel;

a second enclosure panel extending at least partially between a third mounting member of the second plurality of mounting members and a fourth mounting member of the second plurality of mounting members, the second enclosure panel removably coupled to the first mounting member and the second mounting member, wherein the second enclosure panel comprises an air intake opening with one or more louvers spanning at least partially the air intake opening;

a third enclosure panel extending at least partially between the first mounting member and the third mounting member and comprising one or more telemetry subsystems communicatively coupled to the plurality of generators; and a protective covering coupled to at least one of the first mounting member, the second mounting member, the third mounting member, and the fourth mounting member, and configured to allow removal of at least one of the first enclosure panel and the second enclosure panel without removal of the protective covering.

2. The system of claim 1, further comprising:

a first contingent mounting member within the first plurality of mounting members; and a second contingent mounting member within the second plurality of mounting members.

3. The system of claim 2, wherein the first contingent mounting member and the second contingent mounting member are uncoupled to an enclosure panel in a first configuration and coupled to one or more enclosure panels in a second configuration.

4. The system of claim 1, wherein the support surface is a cementitious slab.

5. The system of claim 1, wherein the support surface is an aggregate substrate.

6. The system of claim 5, wherein the aggregate substrate is gravel.

7. The system of claim 1, wherein the first distance is wider than a width of a multiple of generators by a clearance threshold.

8. The system of claim 7, wherein the clearance threshold is a percentage of the width of a generator.

9. The system of claim 1, wherein the one or more louvers span the air intake opening substantially vertically.

10. The system of claim 1, wherein the one or more louvers span the air intake opening substantially horizontally.

11. The system of claim 1, wherein at least one of the first enclosure panel, the second enclosure panel, or the third enclosure panel is coupled to an acoustically dampening material.

12. The system of claim 1, wherein the one or more telemetry subsystems include a building management subsystem, a transformer subsystem, a fire protection subsystem, and a panel board subsystem.

13. The system of claim 1, wherein the first mounting member comprises:

a vertical member;

a base plate coupled to a proximal end of the vertical member;

a top plate coupled to a distal end of the vertical member; and a mounting flange.

14. The system of claim 13, wherein the mounting flange comprises a mounting aperture extending from a first surface of the mounting flange to a second surface of the mounting flange and substantially aligns with an enclosure panel mounting aperture of an enclosure panel.

15. The system of claim 1, further comprising a gasket disposed between the first mounting member and the first enclosure panel.

16. The system of claim 1, wherein the first mounting member is an I-beam.

17. The system of claim 1, wherein the first enclosure panel is removably coupled to the first mounting member by a first member spanning between the first mounting member and the second mounting member; wherein the second enclosure panel is removably coupled to the third mounting member by a second member spanning between the third mounting member and the fourth mounting member.

18. A system for enclosing a plurality of generators, the system comprising:

a first level comprising:

a first plurality of mounting members extending in a direction generally vertical from a first support surface, the first plurality of mounting members positioned substantially collinearly when viewed from a first direction along the first support surface, wherein the first plurality of mounting members are positioned a first distance from adjacent mounting members of the first plurality of mounting members;

a second plurality of mounting members extending in the direction generally vertical from the first support surface, the second plurality of mounting members positioned substantially collinearly when viewed from a second direction along the first support surface, wherein the second plurality of mounting members are positioned the first distance from adjacent mounting members of the second plurality of mounting members;

a first enclosure panel extending at least a partially between a first mounting member of the first plurality of mounting members and a second mounting member of the first plurality of mounting members, the first enclosure panel removably coupled to the first mounting member and the second mounting member, wherein the first enclosure panel comprises a fuel access opening positioned within a lower portion of the first enclosure panel; and a second enclosure panel extending at least partially between a third mounting member of the second plurality of mounting members and a fourth mounting member of the second plurality of mounting members, the second enclosure panel removably coupled to the first mounting member and the second mounting member, wherein the second enclosure panel comprises a first air intake opening with one or more louvers spanning at least partially the first air intake opening;

a second level comprising:

a third plurality of mounting members extending in a direction generally vertical from a second support surface, the third plurality of mounting members positioned substantially collinearly when viewed from the first direction along the second support surface, wherein the third plurality of mounting members are positioned the first distance from adjacent mounting members of the third plurality of mounting members;

a fourth plurality of mounting members extending in the direction generally vertical from the second support surface, the fourth plurality of mounting members positioned substantially collinearly when viewed from the second direction along the second support surface, wherein the fourth plurality of mounting members are positioned the first distance from adjacent mounting members of the fourth plurality of mounting members;

a third enclosure panel extending at least partially between a fifth mounting member of the third plurality of mounting members and a sixth mounting member of the third plurality of mounting members, the third enclosure panel removably coupled to the fifth mounting member and the sixth mounting member; and a fourth enclosure panel extending at least partially between a seventh mounting member of the fourth plurality of mounting members and an eighth mounting member of the fourth plurality of mounting members, the fourth enclosure panel removably coupled to the seventh mounting member and the eighth mounting member, wherein the second enclosure panel comprises a second air intake opening with one or more louvers spanning at least partially the second air intake opening; and a protective covering coupled to at least one of the fifth mounting member, the sixth mounting member, the seventh mounting member, and the eighth mounting member, and configured to allow removal of at least one of the third enclosure panel and the fourth enclosure panel without removal of the protective covering.

19. The system of claim 18, further comprising:

a first fluid reservoir positioned on the first support surface;

a second fluid reservoir positioned on the second support surface; and a pump configured to fluidly drive a fluid from the first fluid reservoir to the second fluid reservoir.

20. A system for enclosing a plurality of generators positioned adjacent a primary data center, the system comprising:

a first plurality of mounting members extending in a direction generally vertical from a support surface, the first plurality of mounting members positioned substantially collinearly when viewed from a first direction along the support surface, wherein the first plurality of mounting members are positioned a first distance from adjacent mounting members of the first plurality of mounting members;

a second plurality of mounting members extending in the direction generally vertical from the support surface, the second plurality of mounting members positioned substantially collinearly when viewed from a second direction along the support surface, wherein the second plurality of mounting members are positioned the first distance from adjacent mounting members of the second plurality of mounting members;

a first enclosure panel extending at least partially between a first mounting member of the first plurality of mounting members and a second mounting member of the first plurality of mounting members, the first enclosure panel removably coupled to the first mounting member and the second mounting member, wherein the first enclosure panel comprises an air output opening with one or more louvers spanning at least partially the air output opening, wherein the air output opening is configured to direct heated air away from the primary data center or electrical equipment positioned between the primary data center and the first enclosure panel;

a second enclosure panel extending at least partially between a third mounting member of the second plurality of mounting members and a fourth mounting member of the second plurality of mounting members, the second enclosure panel removably coupled to the first mounting member and the second mounting member, wherein the second enclosure panel comprises an air intake opening with one or more louvers spanning at least partially the air intake opening;

a third enclosure panel extending at least partially between the first mounting member and the third mounting member and comprising one or more telemetry subsystems communicatively coupled to the plurality of generators; and an energy conversion device positioned between the first enclosure panel and the second enclosure panel and configured to be removed from an opening formed by removal of the second enclosure panel.

* * * * *